US00RE37630E

(19) United States
(12) Reissued Patent
Behr

(10) Patent Number: US RE37,630 E
(45) Date of Reissued Patent: Apr. 9, 2002

(54) REFRIGERATED MERCHANDISER WITH MODULAR EVAPORATOR COILS AND EEPR CONTROL

(75) Inventor: John A. Behr, Defiance, MO (US)

(73) Assignee: Hussmann Corporation, Bridgeton, MO (US)

(21) Appl. No.: 09/560,630

(22) Filed: Apr. 27, 2000

Related U.S. Patent Documents

Reissue of:
(64) Patent No.: 5,743,098
Issued: Apr. 28, 1998
Appl. No.: 08/655,157
Filed: May 29, 1996

U.S. Applications:

(63) Continuation of application No. 08/407,676, filed on Mar. 14, 1995, now abandoned.

(51) Int. Cl.[7] ..... A47F 3/04
(52) U.S. Cl. ..... 62/80; 62/199; 62/217; 62/255
(58) Field of Search ..... 62/80, 199, 200, 62/217, 255, 256; 165/DIG. 307; 236/75; 251/129.11

(56) References Cited

U.S. PATENT DOCUMENTS

| | | | |
|---|---|---|---|
| 1,953,118 A | 4/1934 | MacLeod | 257/137 |
| 2,075,838 A | 4/1937 | Torrey | 62/116 |
| 2,133,963 A | 10/1938 | McCloy | 62/4 |

(List continued on next page.)

OTHER PUBLICATIONS

*The Danfoss Journal*, "Advanced Electronic System Control Of Refrigeration Plant", pp. 3–5, Mar. 1982.
*The Danfoss Journal*, "Evaporator And Suction Pressure Regulation", pp. 12–14, Apr. 1984.
*The Danfoss Journal*, "EKS 67+KVQ, New Electronic Control For Supermarkets", pp. 8–9, Jan. 1985.
*The Danfoss Journal*, "Electronic Temperature Regulator EKS 61", pp. 8–9, Apr. 1985.
*The Danfoss Journal*, "KVQ+EKS 67 Energy Consumption in Two Similar Supermarkets", pp. 6–7, Jan. 1986.
*The Danfoss Journal*, "Demand–regulation Of Refrigeration And Compressor Capacity In Central Systems", pp. 10–12, Mar. 1989.
*The Danfoss Journal*, "Systems For The Control And Monitoring Of Several Evaporators", pp. 10–12, Jan. 1990.
*The Danfoss Journal*, "Refrigeration And Air Conditioning Plant In Fruit And Vegetable Storage", pp. 4–5, Mar. 1990.
"Tuscan TK Meat Case Controller ZA 0599–QAC", Product brochure, Issue C, Oct. 19, 1993.

(List continued on next page.)

*Primary Examiner*—William E. Tapolcai
(74) *Attorney, Agent, or Firm*—Richard G. Heywood

(57) ABSTRACT

An air cooling and control system for a refrigerated food merchandiser having an insulated cabinet with a product area having adjacent product zones, plural modular evaporator coil sections of substantially equal heat exchange potential and being of predetermined length and arranged in horizontal, spaced, end-to-end predetermined disposition and separate air moving means associated with each coil section and a corresponding product zone for circulating separate air flows through the coil sections and to the product area for cooling. The system further includes a first refrigerant metering valve for controlling liquid refrigerant flow on the high side of the evaporator sections, and a second refrigerant metering valve for controlling suction pressure and refrigerant vapor flow on the low side of the evaporator sections. An electronic control senses exit air temperatures downstream of the evaporator sections and operates the second metering valve in response thereto. In another aspect, a method of operating an electronic evaporator pressure regulating (EEPR) valve during the refrigeration and defrost modes of the controlled evaporator and in response to sensed air temperature[s].

59 Claims, 13 Drawing Sheets

U.S. PATENT DOCUMENTS

| | | | | | |
|---|---|---|---|---|---|
| 2,166,813 | A | | 7/1939 | Gibson | 62/6 |
| 2,219,912 | A | | 10/1940 | Bireley | 62/89.5 |
| 2,254,420 | A | | 9/1941 | Cleveland | 62/102 |
| 2,490,413 | A | | 12/1949 | Burtis | 62/89.5 |
| 2,495,554 | A | | 1/1950 | Spangler | 62/89.5 |
| 2,665,072 | A | | 1/1954 | Ray | 236/80 |
| 2,794,325 | A | | 6/1957 | Shearer | 62/89.5 |
| 2,943,643 | A | | 7/1960 | Pinter et al. | 138/46 |
| 3,003,331 | A | | 10/1961 | Coburn et al. | 62/161 |
| 3,063,253 | A | | 11/1962 | Dickson et al. | 62/256 |
| 3,147,602 | A | | 9/1964 | Beckwith | 62/278 |
| 3,168,805 | A | | 2/1965 | Fleury | 60/25 |
| 3,196,626 | A | | 7/1965 | Gabler | 62/89 |
| 3,264,842 | A | | 8/1966 | Dobbie | 62/217 |
| 3,316,731 | A | | 5/1967 | Quick | 62/196 |
| 3,363,433 | A | | 1/1968 | Barbier | 62/197 |
| 3,434,299 | A | | 3/1969 | Nussbaum | 62/199 |
| 3,500,634 | A | | 3/1970 | Waseleski, Jr. et al. | 60/23 |
| 3,501,925 | A | | 3/1970 | Brennan et al. | 62/256 |
| 3,531,945 | A | | 10/1970 | Brennan | 62/234 |
| 3,564,865 | A | | 2/1971 | Spencer et al. | 62/197 |
| 3,698,204 | A | | 10/1972 | Schlotterbeck et al. | 62/206 |
| 3,914,952 | A | * | 10/1975 | Barbier | 62/217 |
| 3,987,642 | A | * | 10/1976 | Portoso et al. | 62/217 |
| 4,364,238 | A | * | 12/1982 | Huelle et al. | 62/217 |
| 4,478,050 | A | | 10/1984 | DiCarlo et al. | 62/193 |
| 4,523,435 | A | | 6/1985 | Lord | 62/212 |
| 4,651,535 | A | | 3/1987 | Alsenz | 62/225 |
| 4,685,309 | A | | 8/1987 | Behr | 62/212 |
| 4,686,835 | A | | 8/1987 | Alsenz | 62/223 |
| 4,735,060 | A | | 4/1988 | Alsenz | 62/225 |
| 4,750,334 | A | | 6/1988 | Leimbach | 62/225 |
| 4,789,025 | A | * | 12/1988 | Brandemuehl et al. | 62/217 |
| 4,845,956 | A | | 7/1989 | Bernsten et al. | 62/225 |
| 4,899,554 | A | | 2/1990 | Kato et al. | 62/442 |
| 4,911,404 | A | | 3/1990 | Dorste et al. | 251/129.08 |
| 4,934,156 | A | | 6/1990 | Barbier | 62/217 |
| 4,958,502 | A | | 9/1990 | Satoh et al. | 62/126 |
| 4,993,231 | A | | 2/1991 | Torrence et al. | 62/115 |
| 5,035,119 | A | | 7/1991 | Alsenz | 62/225 |
| 5,060,910 | A | * | 10/1991 | Iwata et al. | 251/129.11 |
| 5,065,595 | A | | 11/1991 | Seener et al. | 62/212 |
| 5,168,200 | A | * | 12/1992 | Payne | 251/129.11 |
| 5,182,920 | A | | 2/1993 | Matsuoka et al. | 62/206 |
| 5,184,473 | A | | 2/1993 | Day | 62/199 |
| 5,247,806 | A | | 9/1993 | Ebisu et al. | 62/204 |
| 5,251,459 | A | | 10/1993 | Grass et al. | 62/324.1 |
| 5,329,462 | A | | 7/1994 | Friday et al. | 364/505 |
| 5,357,767 | A | | 10/1994 | Roberts | 62/256 |
| 5,361,597 | A | | 11/1994 | Hazime et al. | 62/205 |
| 5,364,066 | A | | 11/1994 | Dorste et al. | 251/122 |
| 5,381,816 | A | | 1/1995 | Alsobrooks et al. | 137/15 |
| 5,396,780 | A | | 3/1995 | Bendtsen | 62/212 |
| 5,408,841 | A | | 4/1995 | Fujiwara et al. | 62/192 |
| 5,533,347 | A | | 7/1996 | Ott et al. | 62/115 |
| 5,572,879 | A | | 11/1996 | Harrington et al. | 62/217 |
| 5,771,908 | A | | 6/1998 | Dorsey | 132/275 |
| 5,921,098 | A | | 7/1999 | Schmidt et al. | 62/202 |

OTHER PUBLICATIONS

Sporlan Valve Company, Bulletin 90–20–1, Apr. 1985, Evaporator Pressure Regulating Valves, pp. 1–4.

Sporlan Valve Company, Bulletin 100–10, Aug. 1987, Electric Temperature Control System, pp. 1–7.

* cited by examiner

REFRIGERATED MERCHANDISER WITH MODULAR EVAPORATOR COILS AND EEPR CONTROL

Matter enclosed in heavy brackets [ ] appears in the original patent but forms no part of this reissue specification; matter printed in italics indicates the additions made by reissue.

This is a continuation of application Ser. No. 08/407,676 filed on Mar. 14, 1995, now abandoned.

BACKGROUND OF THE INVENTION

1. Field of the Invention

This invention relates generally to the commercial refrigeration art, and more particularly to improvements in food product merchandisers and temperature control systems therefor.

2. Description of Prior Art

Great advances have been made in the last forth years in the field of commercial food merchandising with the improved insulation materials, better refrigerants, more efficient air handlers and condensing unit systems, better lighting and the universal use of ambient air temperature and humidity control in food stores and the like. A long checklist of important factors influence the construction and manufacture of food merchandisers including refrigeration requirements and performance, structural engineering for strength, durability and safety as well as insulation effect, servicing capability, product merchandising potential, and both manufacturing and operating costs.

In today's marketplace a wide variety of food merchandisers are used to best market different types of food products as well as meet their cooling needs. In the low temperature field, frozen food merchandisers maintain product display temperatures at about 0° F. and ice cream cases operate at about −5° F. to −10° F. Frozen foods are best protected in reach-in coolers (with glass front doors), but open front, multi-deck merchandisers best display various food products. Similarly, in the medium temperature field of 28° F. to 50° F. product temperature range, glass front deli merchandisers are generally preferred for the marketing of freshly cut meats, cheeses, salads and other deli items, but open front multideck merchandisers are widely used for packaged meat and dairy products and single deck cases are preferred for fresh produce. Thus, even with some industry standardization at eight (8') foot and twelve (12') foot lengths for merchandisers, the manufacture of each commercial refrigerator fixture has remained in hand built operation.

In the past, most commercial merchandisers have utilized evaporator coils of the fin and tube type, which extend the full length of the merchandiser to best achieve uniform air cooling from end-to-end throughout the length. In some applications the evaporator coil was divided into two or more full length sections connected in series refrigerant flow relationship and typically arranged in tandem in the bottom section and/or immediately adjacent in the lower back wall of the merchandiser cabinet. Such coils and the control valving therefor were generally accessible only from the inner lower well area of the product zone for maintenance or service. Furthermore, although such a location does not interfere with the structural soundness of a coffin-type merchandiser, it has been discovered that a back wall evaporator coil location limits the structural support capability for internal vertical frames in multi-deck merchandisers, and the cantilever suspension of glass front panels in a deli merchandiser. The commonly assigned co-pending application Ser. No. 08/057,980 of Michael Grassmuck discloses improvements in hinging and structural supports for glass front panels for deli and reach-in merchandisers, and accommodated the development of the air cooling and control system of the present invention.

Also in the past, pressure regulating valves have been interposed in the evaporator-to-compressor suction line to regulate the refrigerant vapor out-flow from the evaporator coil and for the purpose of establishing and maintaining a certain evaporator suction pressure (relative to the compressor) and producing a corresponding saturated refrigeration temperature within the evaporator coil. One class of these valves have generally only been responsive to the evaporator pressure, or the pressure differential between the evaporator and the compressor—and, additionally, many prior art valves have been controlled by a second pilot valve. Representative of such prior art are:

Hanson U.S. Pat. No. 3,303,664

Another class of back pressure regulating valves have been responsive to temperature—as it affects pressure sensors and triggers pressure responsive diaphragm control of a valve element. Representative of such valves are:

Quick U.S. Pat. No. 3,316,731

Another class of evaporator pressure regulating valves have been designed to be responsive to both temperature and pressure acting through a pilot valve. Representative of this class are:

Pritchard U.S. Pat. No. 2,161,312
Dube U.S. Pat. No. 2,401,144
Boyle U.S. Pat. No. 2,993,348
Miller U.S. Pat. No. 3,242,688

SUMMARY OF THE INVENTION

The invention is embodied in an air cooling and control system for a refrigerated food merchandiser having an insulated cabinet with a product zone, plural modular evaporator coil sections of substantially equal heat exchange potential and being of predetermined length and arranged in horizontal, spaced, predetermined disposition, first refrigerant metering means for controlling liquid refrigerant flow on the high (inlet) side of the evaporator sections, second refrigerant metering means for controlling suction pressure and refrigerant vapor flow on the low (outlet) side of the evaporator sections, and electronic control means sensing exit air temperatures downstream of the evaporator sections and operating the second metering means in response thereto. The invention is further embodies in the method of operating an electronic evaporator pressure regulating (EEPR) valve during the refrigeration and defrost modes of the controlled evaporator and in response to sensed air temperatures.

It is a principal object of the present invention to provide a novel modular evaporator coil that facilitates modular design and fabrication of different refrigerated fixtures, that provides increased coil capacity with a smaller coil size having a reduced refrigerant charge and improved efficiency; that produces better product temperatures; that eliminates return bends and evaporator coil joints and minimizes refrigerant leaks; that can be used in multiple, parallel-piped sections with one or more liquid metering controls; that is responsive to both liquid and suction controls; and that accommodates ease of manufacture, installation and service. Another feature of the invention is in controlling the operation of commercial refrigerator evaporators to maintain preselected food zone temperatures at substantially constant values. Another object is to provide an EEPR valve for suction control of the associated evaporator means during refrigeration and defrost modes and in response to sensed and projected exit air temperatures. Still another object is to provide an improved apparatus and control strategy for regulating the suction pressure of refrigeration evaporators to achieve operating temperatures and maintain exit air and display zone temperatures. These and still other objects and advantages will become more apparent hereinafter.

DESCRIPTION OF THE DRAWINGS

In the accompanying drawings which form a part of this specification and wherein like numerals refer to like parts wherever they occur.

DESCRIPTION OF THE PREFERRED EMBODIMENTS

For disclosure purposes different embodiments of the modular evaporator coil and electronic evaporator pressure regulator (EEPR) control of the present invention are shown in different commercial food display cases or merchandisers as may be installed in a typical supermarket. Such display cases are generally fabricated in standard eight (8') foot and twelve (12') foot lengths, but may be arranged in a multiple case line-up of several merchandisers operating in the same general temperature range. Low temperature refrigeration to maintain display area temperatures of about 0° F. for frozen foods requires coil temperatures generally in the range of −5° F. to −20° F. to achieve exit air temperatures at about −3° F. to −11° F.; and medium temperature refrigeration to maintain fresh food product area temperatures in the range of 34° F. (red meat) to 46° F. (produce) requires coil temperatures generally in the range of about 15° F. to 24° F. with corresponding exit air temperatures at about 24° F. to 37° F. It is clear that a "closed" front case, such as a deli or reach-in having glass panels, will be easier to refrigerate than an open front, multideck merchandiser and that the nature and amount of insulation are also major design factors.

Also for disclosure purposes it will be understood that various commercial refrigeration systems may be employed to operate the air cooling and control systems of the present invention. For instance, conventional closed refrigeration systems of the "back room" type having multiplexed compressors may be used, or merchandisers of the present invention may be operated by strategically placed condensing units located in the shopping arena—of the type disclosed and claimed in commonly assigned, co-pending patent application Ser. No. 08/057,617. In either event, the general operation of refrigeration systems will be understood and readily apparent to those skilled in the art, and various refrigerant terms such as "high side" and "low side" and "exit air" will be used in their conventional refrigeration sense.

Figure 1:
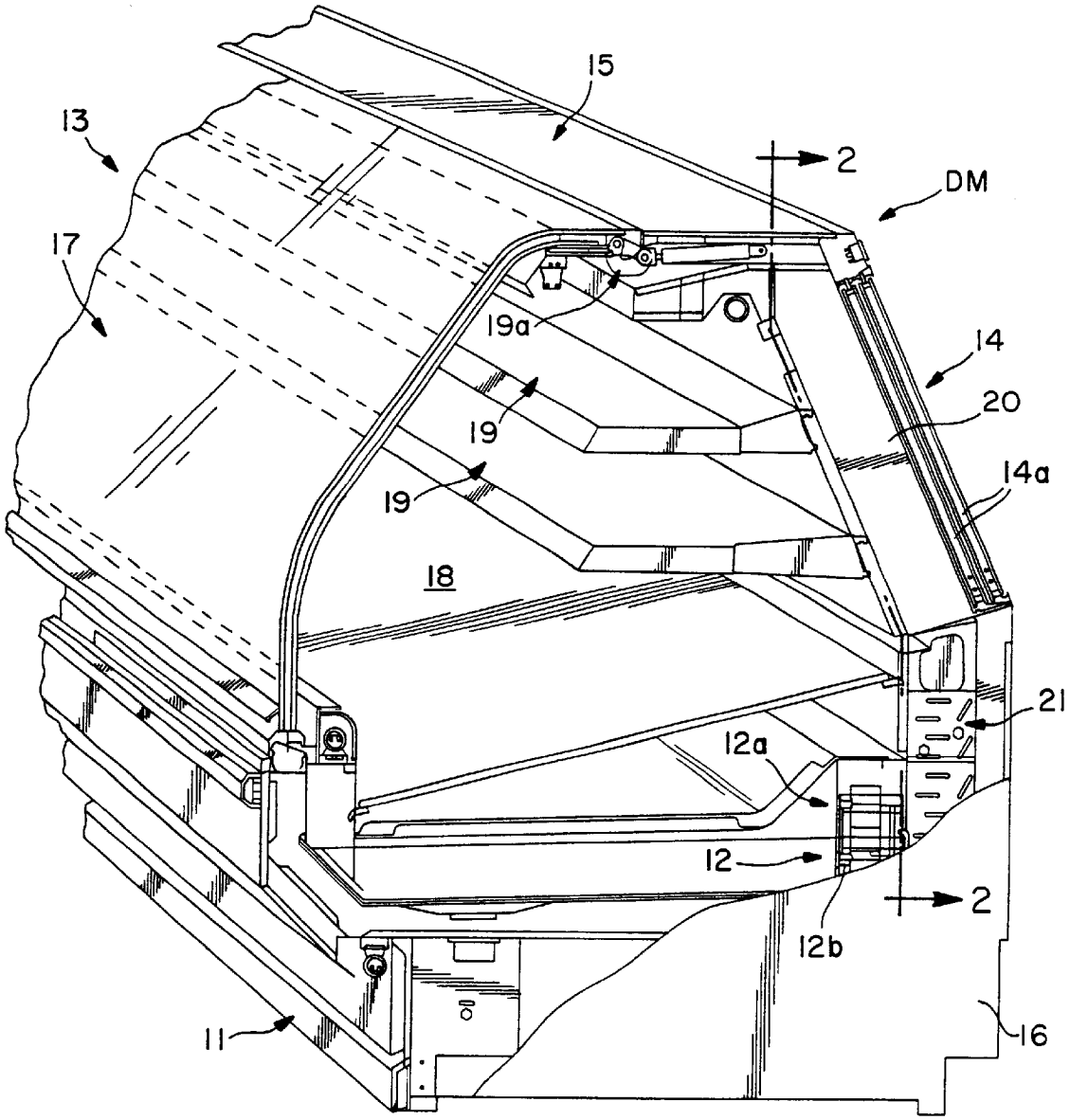
FIG. 1 is a vertical cross-sectional view—in extended fragmentary perspective—illustrating a glass front deli merchandiser environment for the present invention.
Figure 2:
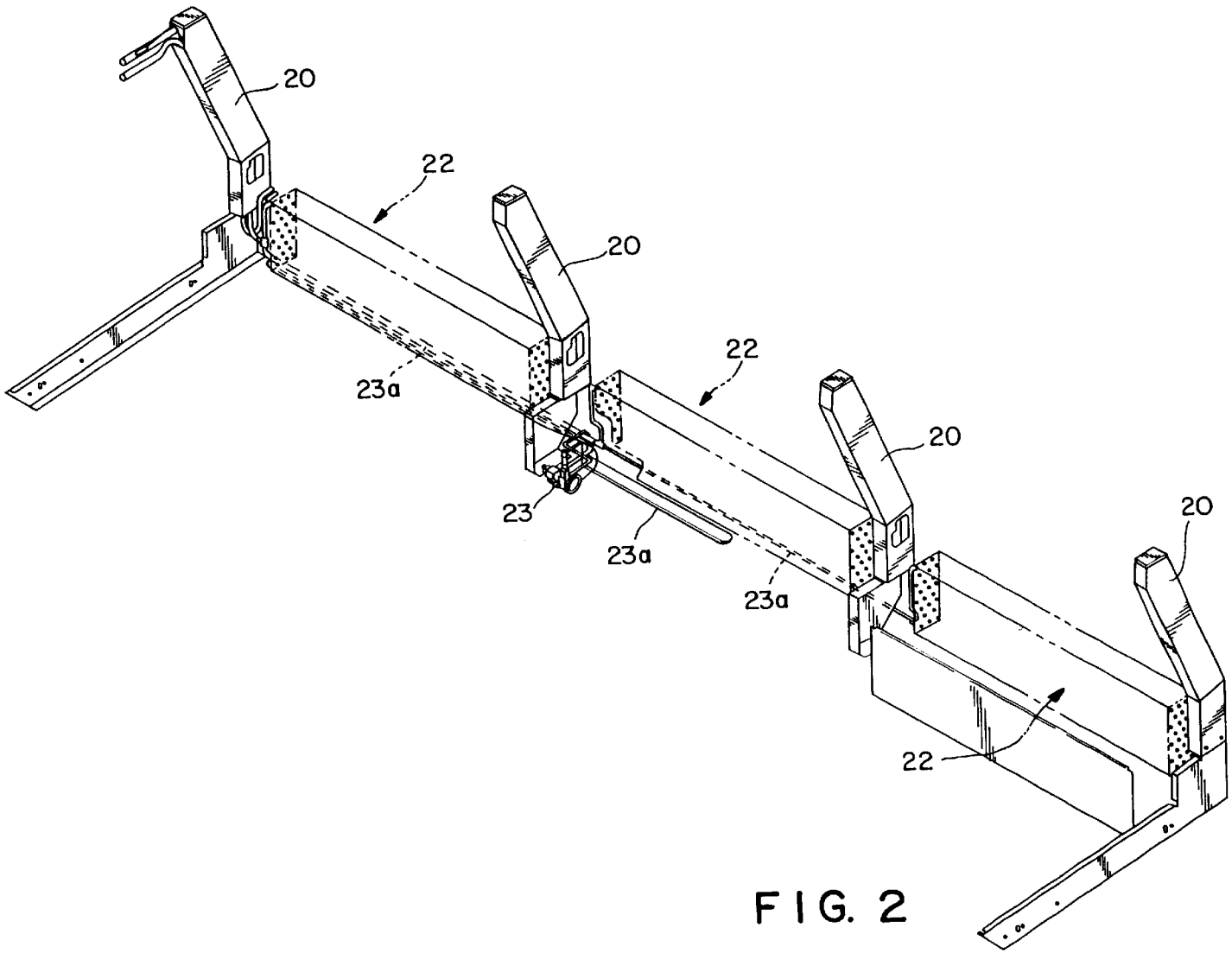
FIG. 2 is a fragmentary perspective view taken substantially along line 2—2 of FIG. 1 and showing one embodiment of the modular evaporator coil feature of the present invention.
Figure 3:
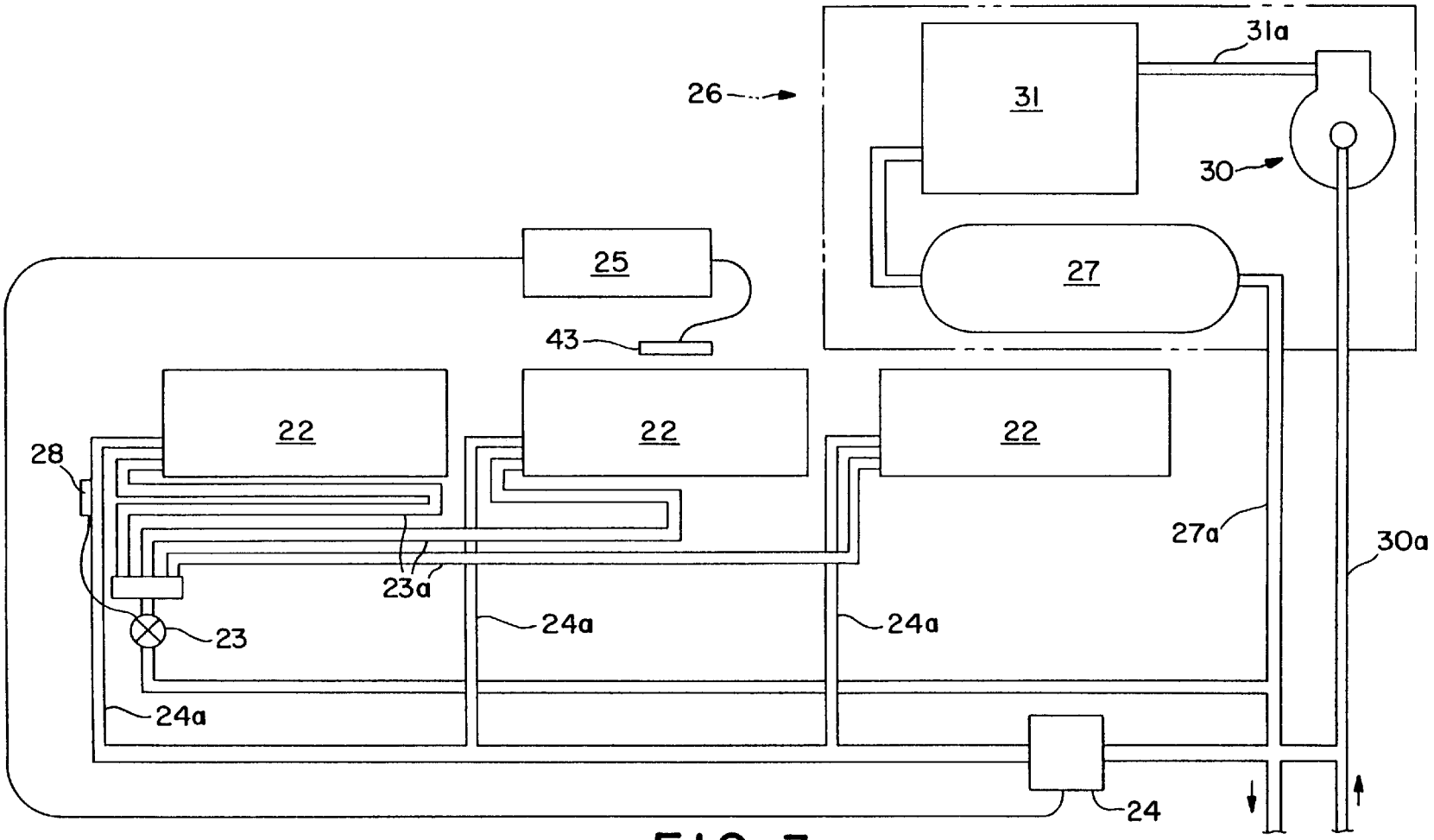
FIG. 3 is a diagrammatic representation of the FIG. 2 modular coil embodiment and the EEPR control therefor.

Referring to FIGS. 1–3 illustrating one embodiment of the invention, a closed deli merchandiser DM basically comprises a cabinet 10 mounted on a lower base section 11 housing air circulation means 12 and having an upper cabinet or display section 13. Typically, the upper cabinet section 13 has a sloping rear service wall 14 constructed and arranged to provide sliding access service doors 14a, a short horizontal top wall 15, end walls 16 and double-curved glass front panels 17 conforming generally to the configuration of the end wall front margin and which all together define a refrigerated product display zone 18 having shelf means 19 therein. The lower section 11 and the rear, top and end walls of the upper section 13 will be insulated as needed to maintain optimum refrigerated conditions in the display area 18. The glass panels 17 normally close the product area 18 from ambient but are hinged, at 19a, for opening movement for stocking, cleaning or service. The weight of these panels 17 is translated to the base 11 through struts 20, which are spaced apart and accommodate the sliding doors 14a therebetween. The air circulating means 12 comprises a plenum chamber 12a in the bottom of the cabinet 13, and plural fans 12b to re-circulate air through the cabinet and display area 18.

A feature of the invention resides in the refrigeration means 21 for the merchandiser DM, and specifically in the use of plural modular evaporator coil sections 22 in lieu of conventional full length coils, as will be described more fully. Another feature of the invention is in the refrigeration control for the merchandiser DM, which includes a high side liquid control or metering means in the form of a thermostatic expansion valve 23 and also includes a low side suction control or metering means in the form of an EEPR valve 24 and electronic controller 25 therefore, as will also be described in greater detail hereinafter.

Referring to FIG. 3 wherein a typical refrigeration system 26 is illustrated, it will be seen that the expansion valve 23 receives high pressure liquid refrigerant from the system receiver 27 through liquid line 27a and meters liquid through a distributor (not shown) and feed lines 23a to the modular coils 22 in response to suction temperature/pressure sensed by bulb 28 in a conventional manner. The suction lines 24a from the modular coils 22 are constructed and arranged with the EEPR valve 24 on the low side to return superheated refrigerant vapor to the suction side of the system compressor means 30 through main suction line 30a. The compressor means 30 discharges high pressure vaporous refrigerant through discharge line 31a to condenser 31, in which the refrigerant is cooled and condensed to a liquid state and discharged through line 31b to the receiver 27 to complete the circuit. As indicated by the arrows at the liquid and suction lines 27a, 30a, the refrigeration system 26 may operate additional food merchandisers in the same temperature range.

Each type of commercial refrigerated merchandiser in the past largely has been individually designed for its own food display or storage purpose, and fabrication generally has been a custom assembly process. These prior art merchandisers have had solid, bulky internal frames with heavy insulation therebetween and fully supporting inner cabinets with full length evaporator coils to achieve even, balanced air flow from end-to-end of the display area. It has been discovered that modular internal-external support frame structures can effectively support most commercial merchandiser cabinets—whether single deck as in deli and produce types, or 2–5 multideck cases for frozen foods, meat or dairy which have the greater shelf weight incident thereto. The modularity of the evaporator coil concept of the present invention accommodates the use of novel cabinet frame members that carry the weight of insulated panels, shelving and duct forming members and translate it to an external frame assembly.

Thus, the modular evaporator coils 22 of the invention—while of conventional fin and tube configuration—constitute an advance in the commercial merchandiser field in several respects. The modular coils 22 are standardized in four (4') foot lengths to accommodate more flexibility in placement and facilitate the use of modular framing, as disclosed more fully in a commonly assigned co-pending patent application Ser. No. 08/404,036 of Martin J. Duffy entitled Refrigerated Merchandiser With Modular External Frame Structure. The shorter modular coil 22 has continuous serpentine coil tubes without end joints or the like thereby virtually eliminating coil leaks. The tubing is of smaller diameter than feasible for eight or twelve foot coils and reduces the total amount of refrigerant charge needed. The fins of the coil are more closely spaced than is conventional but with the use of smaller tubing still produce a larger volumetric air space through the coil for more efficient heat exchange and cooling of air recirculated by the fans 12b without added air side resistance. For instance, prior art coils used either ¾" O.D. tubing with tube spacing at 2" from center-to-center, or ⅝" O.D. tubing with tube spacing at 1⅜". It has been discovered that 7/16" O.D. tubing can be spaced at 1.2" and still produce 50% more heat transfer fin surface than conventional coils. The result is better coil performance, use of less material and smaller refrigerant change, fewer joints and less leakage, and better defrost capability.

Thus, still referring to FIGS. 1–3, a plurality of modular coils 22 embodying these features are constructed and arranged in horizontally spaced, end-to-end (i.e., collinear) relationship. FIG. 2 indicates that the deli merchandiser DM of FIG. 1 is a twelve foot case, and thus has three equal sized coil sections 22 which are disposed between the structural struts 20 in this closed-type merchandiser. In the embodiment shown best in FIGS. 2 and 3, the high side liquid metering means comprises a single thermostatic expansion valve 23 arranged to deliver equal amounts of refrigerant to each coil section 22, and thus the feed lines 23a are constructed and arranged to be the same length from the valve outlet to the inlets of the respective coil sections 22. The placement of the expansion valve 23 at the center coil 22 means that the feed line 23a thereto has to be bent or otherwise arranged to accommodate the extra length relative to the shorter direct distance between the valve 23 and center coil inlet.

Figure 7:
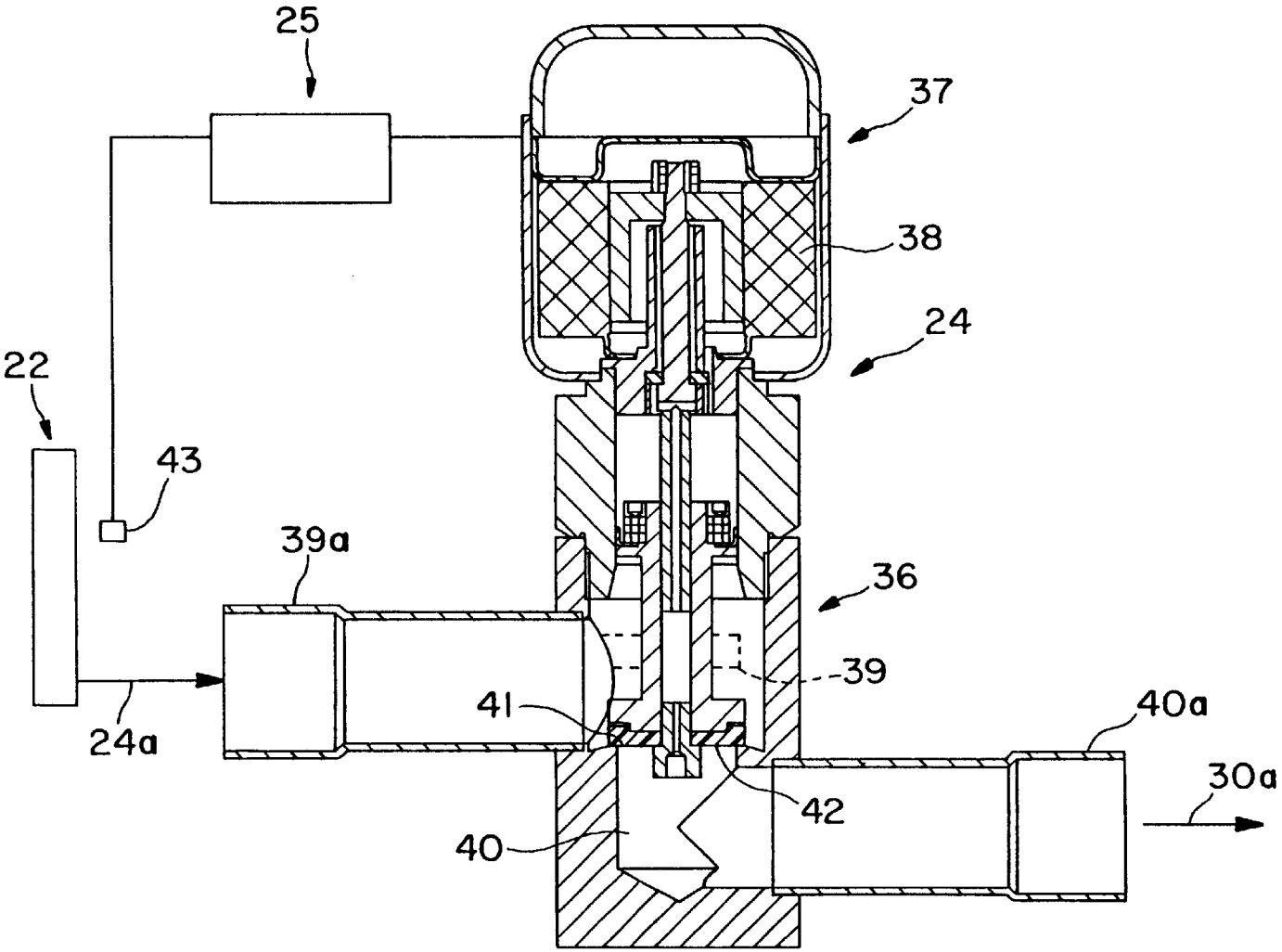
FIG. 7 is a cross-sectional view—with diagrammatically extended control circuit—showing the EEPR valve control of the present invention.

Referring now to FIGS. 3 and 7, the EEPR valve 24 of the present invention is disposed in the suction line exiting the coil sections 22 and within the merchandiser, and it is between the modular coils 22 and the compressor suction. The EEPR valve 24 has a valve body section 36 and a control head 37, which has a stepper motor 38. The valve body section 36 has an inlet chamber 39 with an inlet 39a connected to the suction lines 24a of the coil sections, and an outlet chamber 40 with an outlet 40a connected to compressor suction line 30a. An annular valve seat 41 is formed between the chambers 39, 40 and a valve element 42 is axially movable relative to the valve seat 41 between a fully closed position (as shown) and a fully open position. The position of the valve element 42 is controlled by the stepper motor 38, as operated from the controller 25 in response to sensed air temperatures exiting the modular coils 22. At least one air temperature sensor 43 is strategically located on the downstream (exit) side of a coil section 22 and communicates to the controller 25, as will be described. In the preferred embodiment, a sensor 43 is provided for each coil section 22, and the controller averages the readings from the multiple sensors for use in determining control strategy for the EEPR valve.

Figure 4:
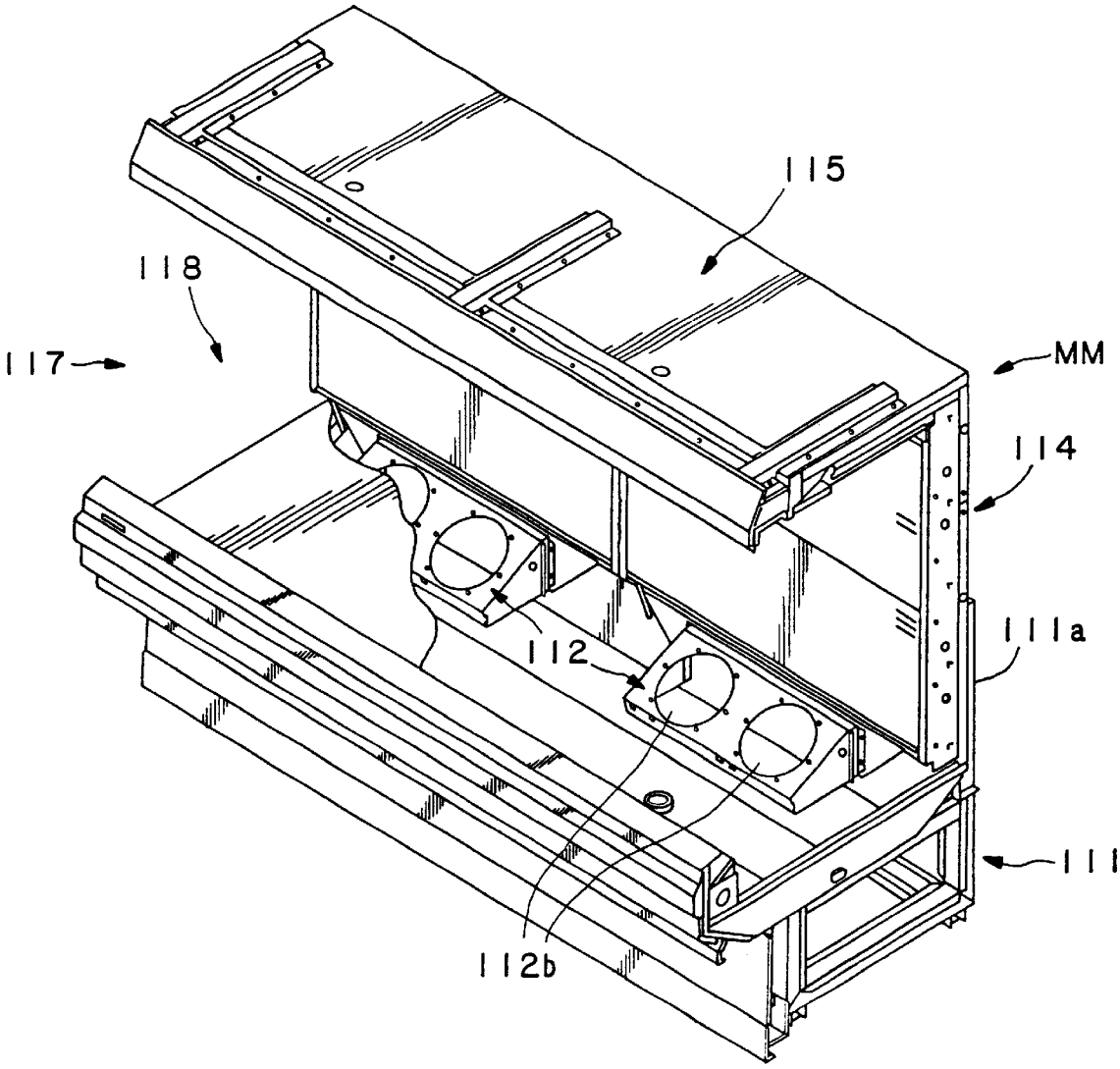
FIG. 4 is a perspective view, partly broken away, illustrating an open front, multideck merchandiser environment for the present invention.
Figure 5:
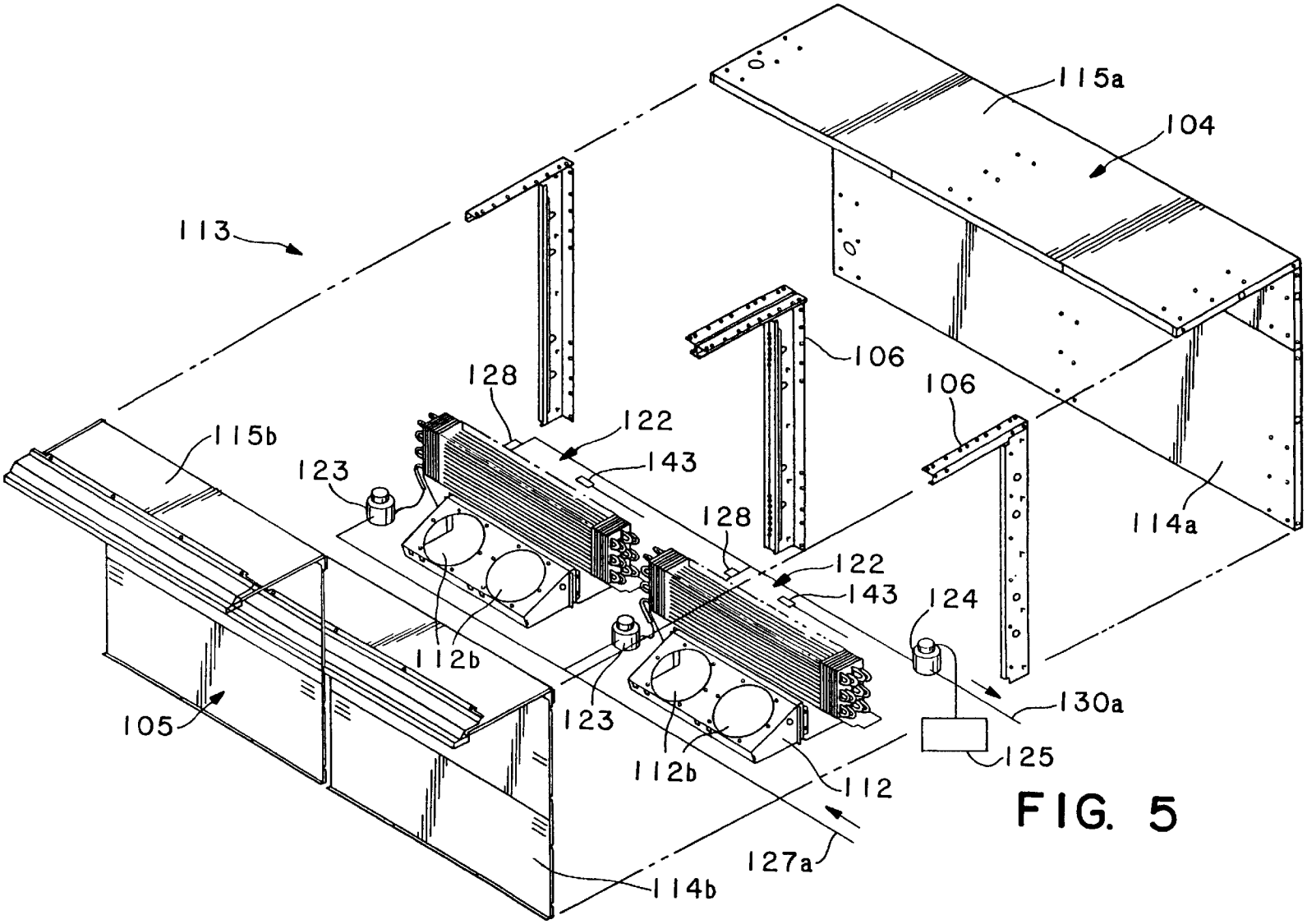
FIG. 5 is an exploded view of the insulated cabinet and air control components of FIG. 4 and showing another embodiment of the modular coil and the EEPR control invention.
Figure 6:
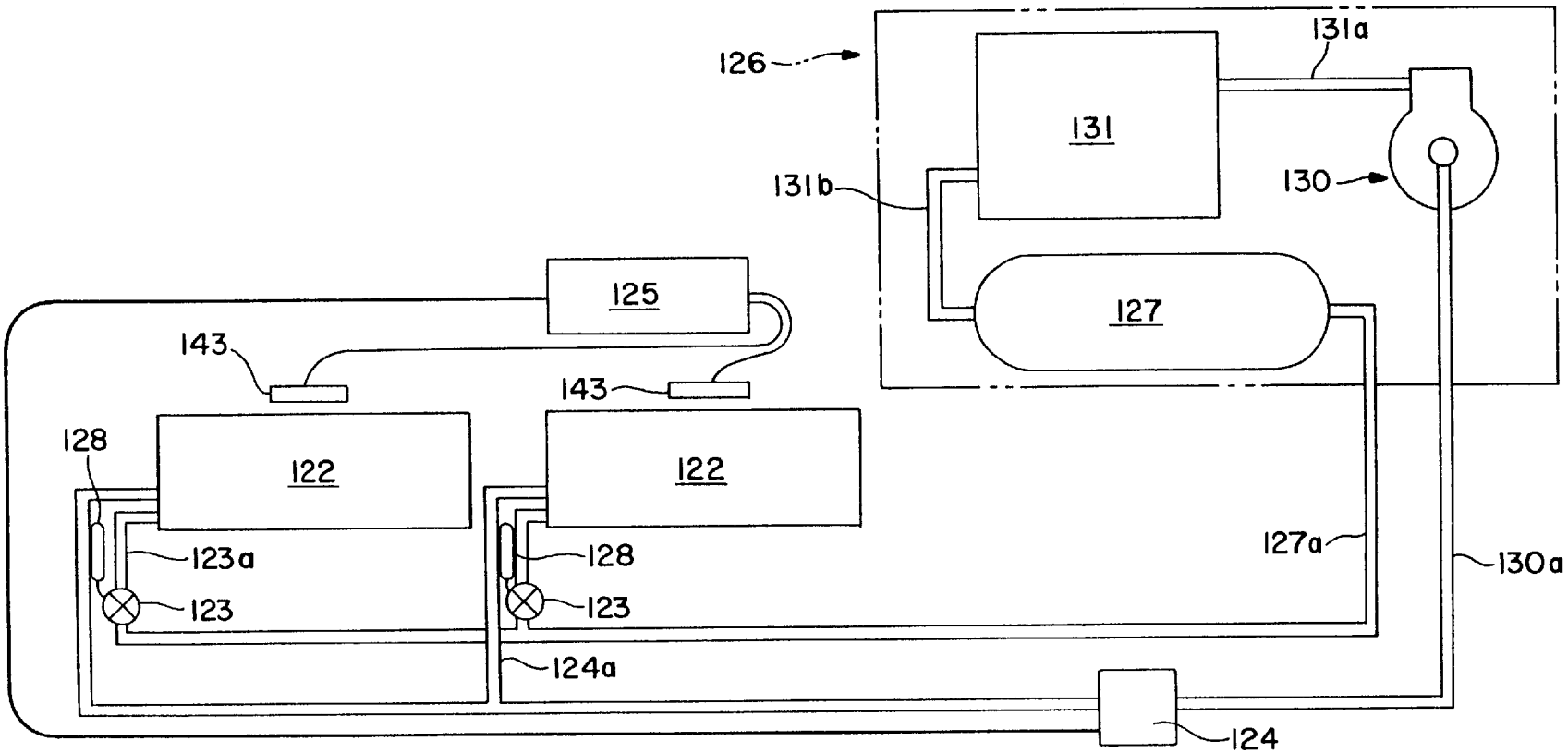
FIG. 6 is a diagrammatic representation of the FIGS. 4 and 5 embodiment.

It will be understood that air temperature control for the product zone of a closed single deck deli merchandiser DM is more easily accomplished than for the product zone of an open front, multideck merchandiser, such as the four deck meat merchandiser MM of FIGS. 4–6. As seen, the single expansion valve 23 may be used in the deli case DM, and a single sensor 43 may be employed in the control of the EEPR valve 24. Therefore, alternate embodiments of the modular coil feature will be disclosed before a detailed explanation of the EEPR valve control.

Referring to FIGS. 4–6, the open front multideck merchandiser MM is described with reference numerals in the "100" series. The merchandiser MM has lower structural base frame 111 and an external vertical structural frame 111a that carry an upper cabinet section 113 with a rear panel 114, a top wall 115, end walls (not shown) and together defining a refrigerated product display zone 118 having a front opening 117. Suitable shelving (not shown) or other product display means (i.e. pegboard) are mounted in the display zone 118. The exploded view of FIG. 5 illustrates that the upper cabinet 113 is comprised of an outer insulated panel 104 having a vertical back section 114a and top section 115a, and an inner panel or liner 105 having a vertical section 114b and a horizontal top section 115b. These outer and inner panels 104 and 105 are assembled in spaced relation by spaced internal frame members 106 to define connecting rear and top air distribution ducts (not shown). A lower cabinet panel 107 covers an air duct 112a which connects with air circulating plenums 112 having fans 112b. Modular coil sections 122 are disposed in horizontal end-to-end relationship between the internal frames 106 and communicate with the air circulating means 112 to cool the air flow to produce design exit air temperatures for product cooling in the display zone 118.

In the embodiment of FIGS. 4–6, the liquid metering means comprises a separate expansion valve 123 for each coil section, and is operated independently in response to its own sensing bulb (128) and preset condition. The EEPR valve 124 and its controller 125 are positioned within the merchandiser and employ separate air temperature sensors 143 downstream of the respective coils 122. It is also a feature of the invention to employ separate EEPR valves 124 for each evaporator section 122, but with a single controller 125.

Figure 11:
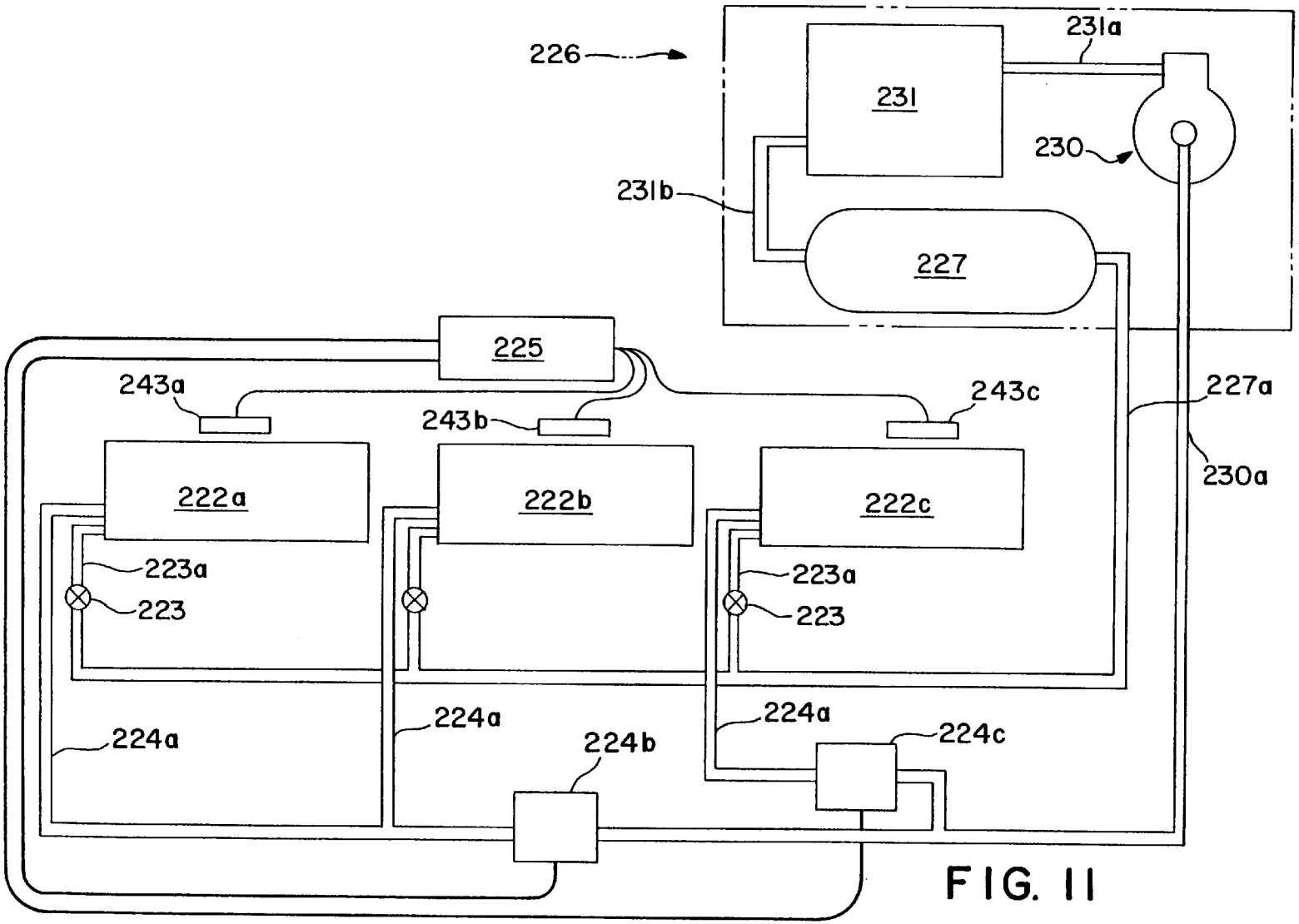
FIG. 11 is a diagrammatic depiction of the modified air cooling system of FIG. 10.

Metering of refrigerant through the evaporators 22, 122 for refrigeration of the merchandiser product zone 18, 118 is carried out by one of more expansion valves 23, 123 and one or more EEPR valves 24, 124. Various configurations of expansion valves and EEPR valves are possible according to the nature of the merchandiser and its refrigeration requirements. The configuration shown in FIG. 3 comprises a single expansion valve 23 and a single EEPR valve 24. In FIG. 6, there is shown one expansion valve 123 for each evaporator 122 in the merchandiser MM and a single EEPR valve 124 on their common suction line. To control one coil at a different temperature than the other coils, its suction side may have its own EEPR valve, as shown in FIG. 11.

The amount of refrigeration carried out by the evaporators 22, 122 is controlled by operation of the EEPR valves 24. The function of the expansion valves 23, 123 is to optimize the refrigeration operation by maintaining an optimal refrigerant superheat value (e.g., 5° F.) on the suction side of the evaporators, not to achieve temperature control. Thus, each expansion valve 23, 123 is modulated solely in response to the temperature of the refrigerant detected by sensing bulb 28, 128 located on the outlet end of its corresponding evaporator. The expansion valve can be made relatively inexpensively and preset for operating in a predetermined manner in response to the temperature detected by its sensing bulb. It is not believed to be necessary in most instances to readjust the expansion valve after installation.

The expansion valves 23, 123 and their corresponding sensing bulbs 28, 128 can be arranged in several different configurations, the following descriptions of which are not intended to be exhaustive. For instance, the single expansion valve 23 used for all three evaporators, as shown in FIG. 3, is controlled by the sensing bulb 28 located on the suction line just downstream of the last evaporator. As shown in FIG. 6, each evaporator 122 has its own dedicated expansion valve 123 which is operated by the sensing bulb 128 located adjacent to the outlet of that evaporator. Substantially the same arrangement of expansion valves and sensing bulbs is shown in FIG. 11, to be described.

The present invention is to be contrasted with evaporator temperature control in a merchandiser (not shown) by expansion valves which are modulated in response to detected exit air temperature from the evaporators. Exit air temperature control for a particular evaporator by operation of an expansion valve at a substantially constant suction pressure will result in variations in the superheat of the refrigerant leaving the evaporator. For example, when the exit air temperature is too cold, the expansion valve throttles down and reduces the refrigerant flow entering the evaporator. As a result, all of the refrigerant in the evaporator is completely vaporized well prior to reaching the outlet of the evaporator. Failure to keep the evaporator substantially full of boiling refrigerant causes a loss in efficiency, non-uniform frost build up on the evaporator requiring more frequent defrost cycles, and additional dehumidification. Accordingly, the present invention closely controls saturated evaporator temperature by locating the EEPR valve 24 near the evaporator, preferably in the merchandiser itself, and the expansion valve functions to make sure that the evaporator operates efficiently by maintaining a substantially constant superheat.

Operation of the EEPR valve 24, 124 is controlled by the controller 25, 125 mounted in the merchandiser and connected to a valve circuit of the EEPR valve for selectively activating its stepper motor 38 to open, close or modulate the valve opening, at 41. The temperature sensor 43, 143 located next to the evaporators detects the exit air temperature from the corresponding evaporator. These sensors are capable of generating signals corresponding to the temperature detected and transmitting them to the controller 25, 125. The controller uses an average of the sensed temperature values in the control of the EEPR valve 24, 124, as described more fully below. It is to be understood that a greater or lesser number of temperature sensors could be used, that sensors for detecting parameters other than temperatures could be used and that the signals from the sensors could be processed differently for use in controlling the EEPR valve without departing from the scope of the present invention.

In order to achieve the necessary accuracy in the position of the EEPR valve element 42, the controller is configured to compensate for the inherent looseness or lost motion in the gearing arrangement (not shown) connecting the stepper motor 37 to the valve element 42. The correspondence between the position of the stepper motor and the position of the valve element might normally be lost in making fine adjustment. Such loss could occur when the direction of motion of the motor 37 changes, such as when the motor first moves the valve element 42 to a more open position in chamber 39 and then attempts to reversely move the valve element by a small amount to a more closed position. When the direction of motion changes, the looseness in the gears may result in no motion of the valve element, even though the stepper motor moves to a position which should correspond to a new valve position. To overcome this inherent inaccuracy, the controller 25, 125 operates so that the movement of the valve element 42 to the final position called for by the controller always occurs from the same direction as the previous movement. More specifically, the valve element is always moved to its final position in a valve opening direction, which permits the use of refrigerant pressure to keep the gears tight. For example, the valve element may be at a position corresponding to 1000 steps of the stepper motor 37 when the control algorithm calls for the valve to be at a position of 950 steps (corresponding to a more closed position of the valve). The controller activates the valve circuit to run the motor to a position of 940 steps—i.e., past the position called for by the control algorithm—and then to the final set position of 950 steps. The position will be highly accurate because the refrigerant pressure in the suction line tends to push the valve element open so that any slack in the gears is removed by action of the pressure.

Figure 8:
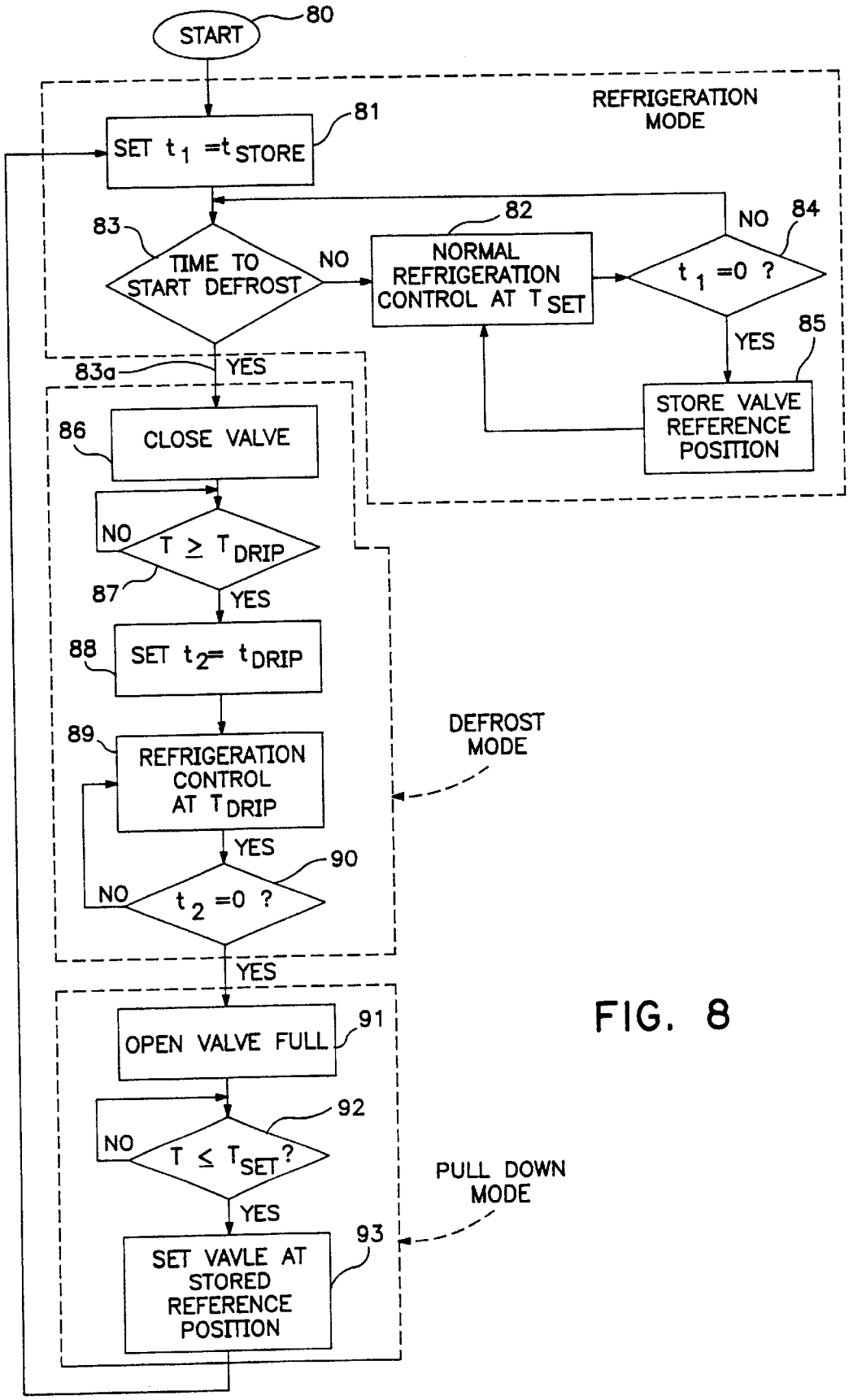
FIG. 8 is a diagrammatic flow chart of the controller operation for the EEPR valve.

Referring now to the flow chart of FIG. 8, the operation of the EEPR valve 24, 124 is schematically shown to include a start sequence 80 which incorporates special operations (not illustrated in detail) both upon start up of the refrigeration system and initial operation of the controller 25, 125 for the EEPR valve. The operation of the EEPR valve will be described in terms of the merchandiser MM illustrated in FIGS. 4–6 having an eight (8') foot length with two evaporators 122 and one temperature sensor 143 associated with each evaporator. Activation of the controller 125 energizes the circuit to run the stepper motor (137) to a position well past the closed position of the valve element (142). The position of the stepper motor is then stored by the controller as a reference "close" position for future operations. In addition, when the refrigeration system 126 is first activated (or re-activated after being shut down) the controller 125 is programmed to rapidly pull down the temperature of the merchandiser MM by moving the EEPR valve element (142) to a fully open position until such time as the temperature sensors 143 detect an average temperature T which is less than or equal to the temperature set point $T_{set}$ for the merchandiser.

Upon leaving the start sequence 80, the controller enters into a refrigeration mode including a control routine 82 toward maintaining the exit air temperature T from the evaporators (122) at $T_{set}$ by modulation of the EEPR valve 124. The refrigeration mode 82 includes modulation of the valve opening (by changing the position of the valve element) in response to the temperature T detected by the sensors, as well as periodic checks 83 to determine the start of a defrost mode, and data storage of valve reference positions (85) such as represented by the valve position which maintained average exit air temperature T generally equal to $T_{set}$ during the normal refrigeration mode. The valve reference position is used as an initial setting for the EEPR valve at the beginning of the next normal refrigeration mode following a defrost mode.

The controller is preprogrammed with a default valve reference position for use in setting the EEPR valve during the first refrigeration mode following start up of the system. A new valve reference position will be stored by the controller at a scheduled later time sufficiently far removed from initial operation in the refrigeration mode so that the EEPR valve has time to settle into a reasonably stable operating mode (i.e. position) for maintaining exit air temperature at $T_{set}$. Thus upon initiation of the refrigeration mode, the controller (at 81) first sets a valve reference position storage time $t_1$ equal to a store time period $t_{store}$. In a preferred embodiment, $t_{store}$ equals 60 minutes. A timer in the controller begins counting down the time $t_1$ from $t_{store}$ until $t_1$ reaches zero (see 84). The controller then stores the valve reference or average position (see 85) of the EEPR valve element as a reference for the next refrigeration mode.

Throughout the refrigeration mode, the controller is receiving temperature signals from the temperature sensors 143 associated with the evaporators 122. The controller averages the detected temperatures T and uses a control algorithm (e.g., a PID control algorithm) to process the average temperature and produce a control signal for the stepper motor to modulate the valve opening. In this way, the EEPR valve is operated to change the suction pressure seen by the evaporator so as to change the temperature of the evaporator. Although not illustrated, the controller includes various alarms to detect failures in the air cooling system.

Initiation of a defrost cycle could be controlled by a timer within the controller, by a master defrost timer located externally of the merchandiser and controlling the refrigeration and defrost cycles for a number of merchandisers in the system 126, or by detection of some parameter other than time. The defrost method may be by off-time (closing off the high side liquid feed) or by electric defrost, and the air circulating means 21 continue to operate to accelerate the heat distribution through the evaporators. It should also be recognized that a typical defrost is typically carried out on a time line that has two components; namely, a de-icing period to fully melt the ice accumulation from the fins 34 and tubing 33 of the coil (which achieves a drip temperature) and a drip period to permit the water to run off the evaporator to prevent a re-freeze condition. It is contemplated that hot or latent gas defrost may also be used as an alternative, in which case the fans 12a would be turned off during the de-icing period of defrost. In any event, when the controller is informed that it is time for defrost (83a), it enters the defrost mode.

Defrost of the evaporators begins by the controller activating the valve circuit to fully close (86) the EEPR valve, stopping the normal refrigeration mode in the merchandiser. The temperature of the exit air from the evaporators begins to rise, and the controller periodically averages the temperatures from the sensors 143 and, at 87, determines if the averaged temperature equals or exceeds a drip time temperature $T_{drip}$ stored in the controller. In the preferred embodiment, the drip time temperature $T_{drip}$ is empirically selected to be an exit air temperature above 32° F. as detected at the end of the de-ice period when all of the ice on the evaporators is gone. The beginning of drip time may be initiated by detection of the absence of ice on the evaporators. One way of accomplishing this is by first detecting a plateau in exit air temperature rise during the defrost mode which indicates that the thermal energy in air passing over the evaporators is being employed in melting the ice. The controller then looks for a exit air temperature rise following the plateau, which indicates the ice is gone and the thermal energy in the merchandiser again goes to heating the air. This rise in exit air temperature signals that de-icing is complete and that drip time has begun (see FIG. 9). In the preferred embodiment following detection of $T_{drip}$, a drip time $t_2$ is reset (88) to a time period $t_{drip}$ and the controller partially opens the EEPR valve to meter refrigerant flow through the evaporators, see 89. The controller then modulates the EEPR valve in response to the averaged sensed temperature to refrigerate the merchandiser at $T_{drip}$. At the same time refrigeration is begun at $T_{drip}$, a timer 90 in the controller is started to count down drip time $t_2$ from $t_{drip}$ to zero. Thus, as shown in FIG. 9, refrigeration at $T_{drip}$ permits the condensate remaining on the evaporators following de-icing to drip off the evaporators while limiting the rise in air temperature in the merchandiser during this final defrost period, thereby minimizing air temperature rise in the product zone 118 and exposure of product to air temperatures substantially greater than $T_{drip}$, while also shortening the subsequent pull-down time.

The controller halts refrigeration at $T_{drip}$ when it finds that the drip time $t_2$ equals zero, indicating the period for drip time $t_{drip}$ has expired. The controller then enters a pull-down mode by fully opening the EEPR valve (91) and holds it open without regard to the detected exit air temperatures T from the temperature sensors 143 until such time as the average detected temperature first equals or goes below $T_{set}$ (92). Overriding the normal modulation of the EEPR valve during the pull-down period following defrost and holding the valve in its fully open position accelerates the pull-down to the refrigeration set point. After the sensed temperature first crosses $T_{set}$, the valve is immediately set to the valve reference position 93 stored from the last operation of the controller in the refrigeration mode. The valve reference position storage time $t_1$ is reset to $t_{store}$ (81) and the refrigeration mode, described above, begins again.

Figure 9:
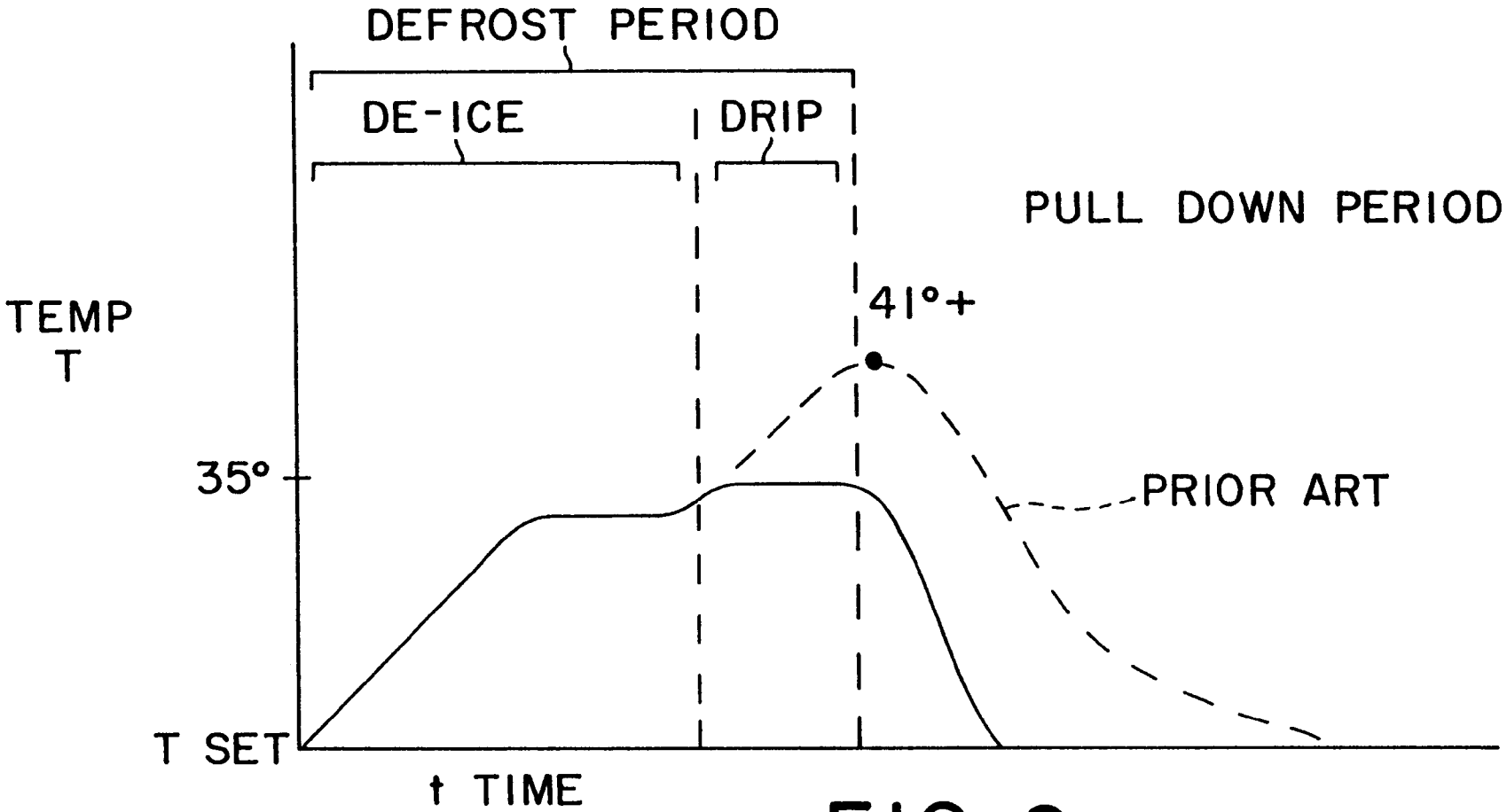
FIG. 9 is a graphic representation of the defrost control function of the present invention.

The effect on exit air temperature caused by operation of the controller and EEPR valve as described is graphically illustrated in FIG. 9 in comparison to a prior art defrost cycle. The de-ice period of defrost in the merchandiser produces a similar exit air temperature rise as occurs during a prior art defrost cycle. The exit air temperature reaches a plateau around (and generally somewhat above) freezing. During this time the ice melts from the evaporators. The exit air temperature begins to rise again when the ice is gone, but defrost does not end because condensate remains on the evaporators. In the prior art, the exit air temperature (illustrated by a dashed line) is permitted to rise for the entire drip time while the condensate is permitted to drip off of the evaporators to produce a clean coil. In practice it is not uncommon for the exit air temperature to exceed 41° F., resulting in an undesirable warming of the product zone in the prior art merchandiser. In contrast, the merchandiser of the present invention limits the exit air temperature to about 35° F. during the drip time, so that the product zone and air duct system remain cooler during the last portion of defrost.

The rapid pull down achieved by holding the EEPR valve in a fully open position results in exit air temperature declining in a steep slope to the set point $T_{set}$. In contrast, if normal prior art modulation of an EPR-type valve is permitted following the end of the defrost period, the exit air temperature approaches the set point $T_{set}$ asymptotically. The reason for this is that the control algorithm causes refrigeration to slow as the set point is approached. Therefore, the set point $T_{set}$ is not reached as quickly in the prior art as with the present invention.

Figure 10:
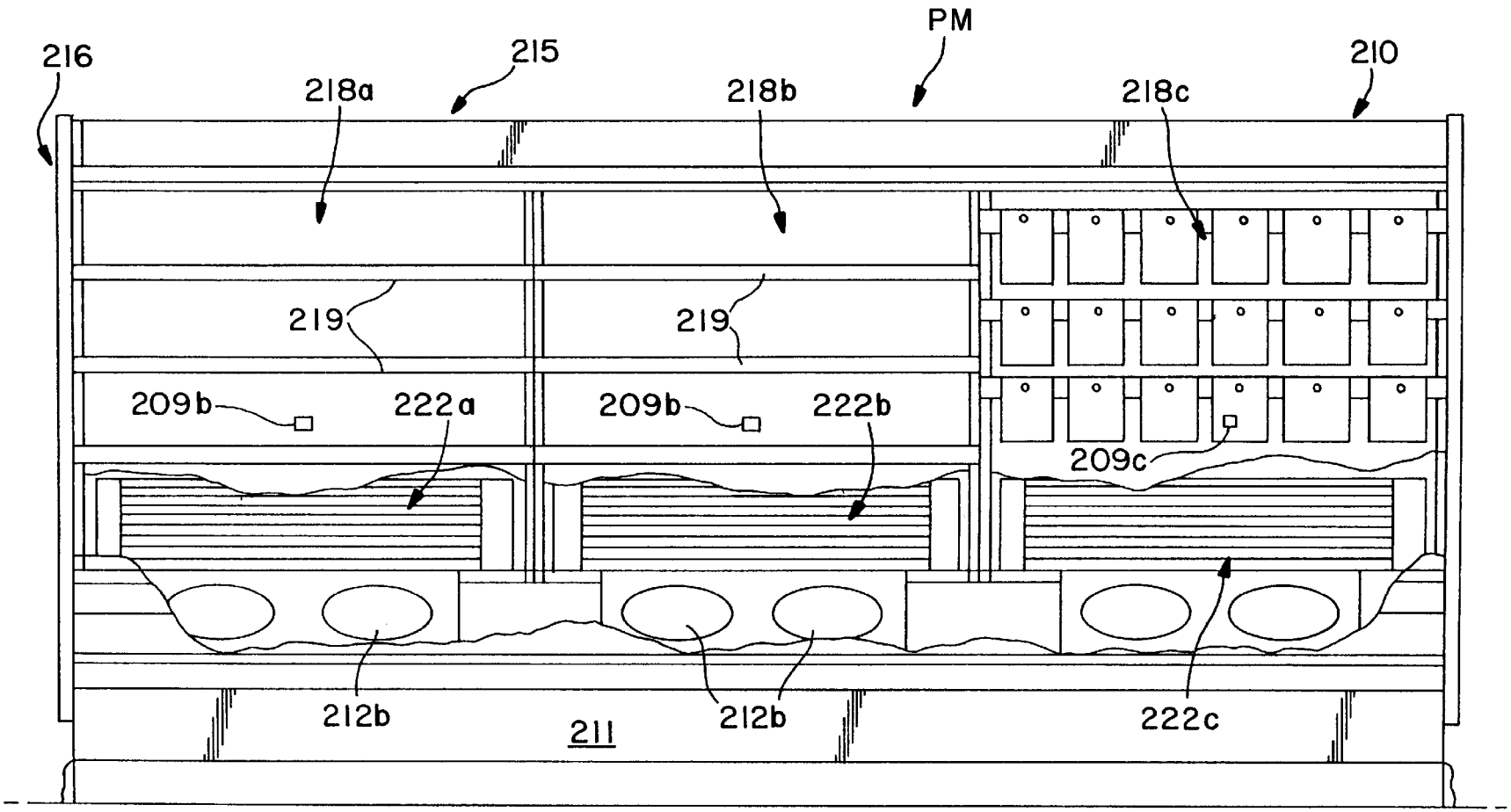
FIG. 10 is a diagrammatic front elevational representation of a typical twelve foot merchandiser to illustrate another modification of the invention.

Referring now to FIGS. 10 and 11 of the drawings, another modified embodiment of the air cooling system invention is shown with reference to open front merchandiser PM of twelve foot length and having a cabinet 210 with three product cooling zones 218a, 218b and 218c. The product zones 218a and 218b are typical of the merchandiser MM shown and described with reference to FIGS. 4–6 in that these zones 218a and 218b have multiple shelves 219 for holding fresh foods requiring medium temperature refrigeration. However, the product zone 218c represents a pegboard-type back panel (205) for the refrigerated display of pre-packaged products, such as cheese and cold cuts. It is known that the air distribution characteristics may differ between adjacent zones of shelving and pegboard or the like, and it may result that the air temperatures may be higher in one zone than desired. In the prior art the solution was to operate the entire case at a lower evaporator temperature. With the modular coil invention, adjustment can be achieved between adjacent zones such as by operating the evaporator coil (222c) at a lower temperature to provide colder exit air temperatures. It is contemplated that, in addition to the temperature sensors 243a, 243b and 243c for the respective coils (222), product zone temperature sensors 209a, 209b and 209c may be provided and the data used by the controller 225 to achieve the operational balance desired. Referring particularly to FIG. 11, one EEPR valve 224b may be used to control two coil sections 222a and 222b and another EEPR valve 224c used for the colder operating coil 222c.

Figure 12:
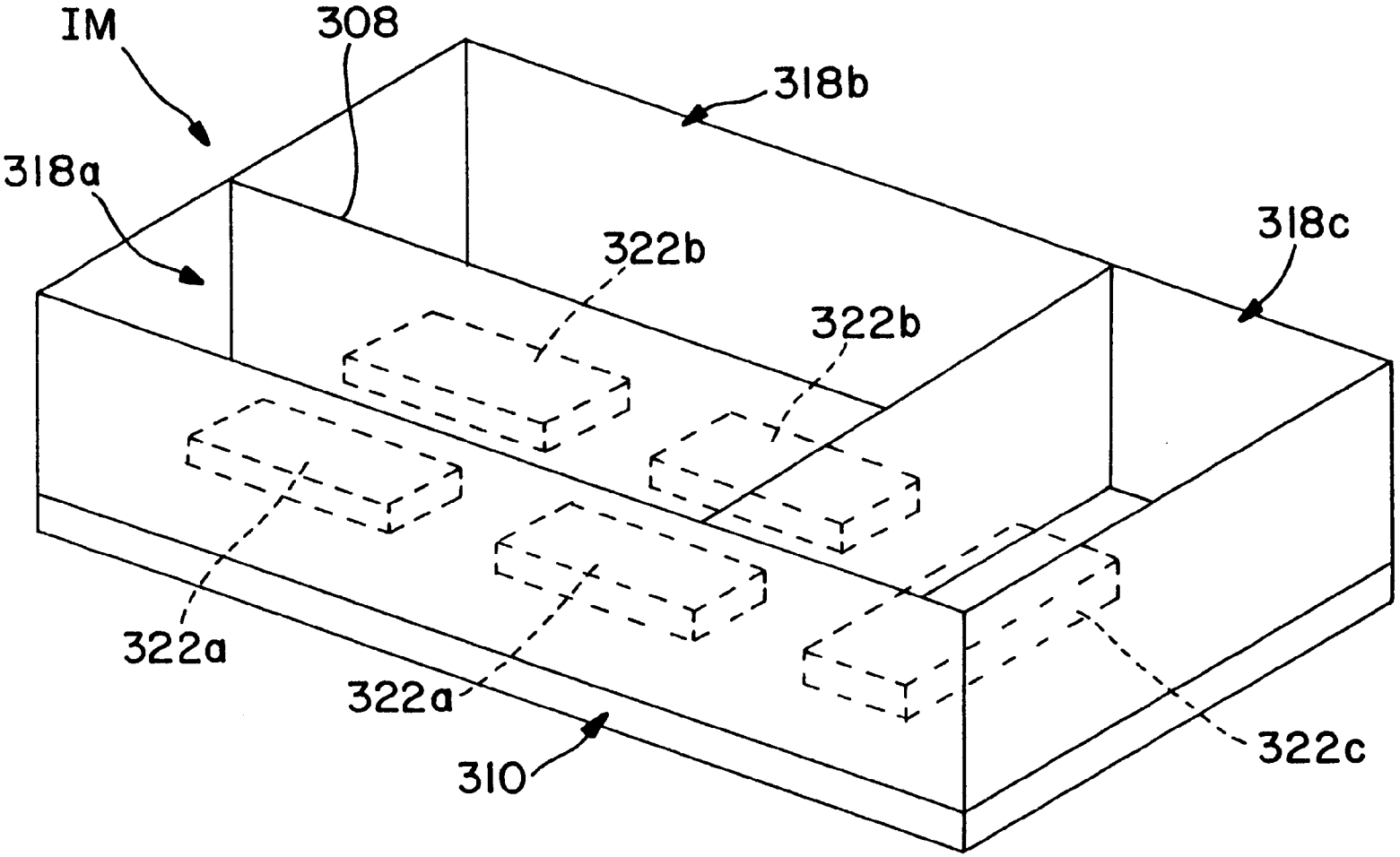
FIG. 12 is a diagrammatic perspective view of a multiple unit island display case illustrating another modified multiple evaporator and EEPR control of the present invention.
Figure 13:
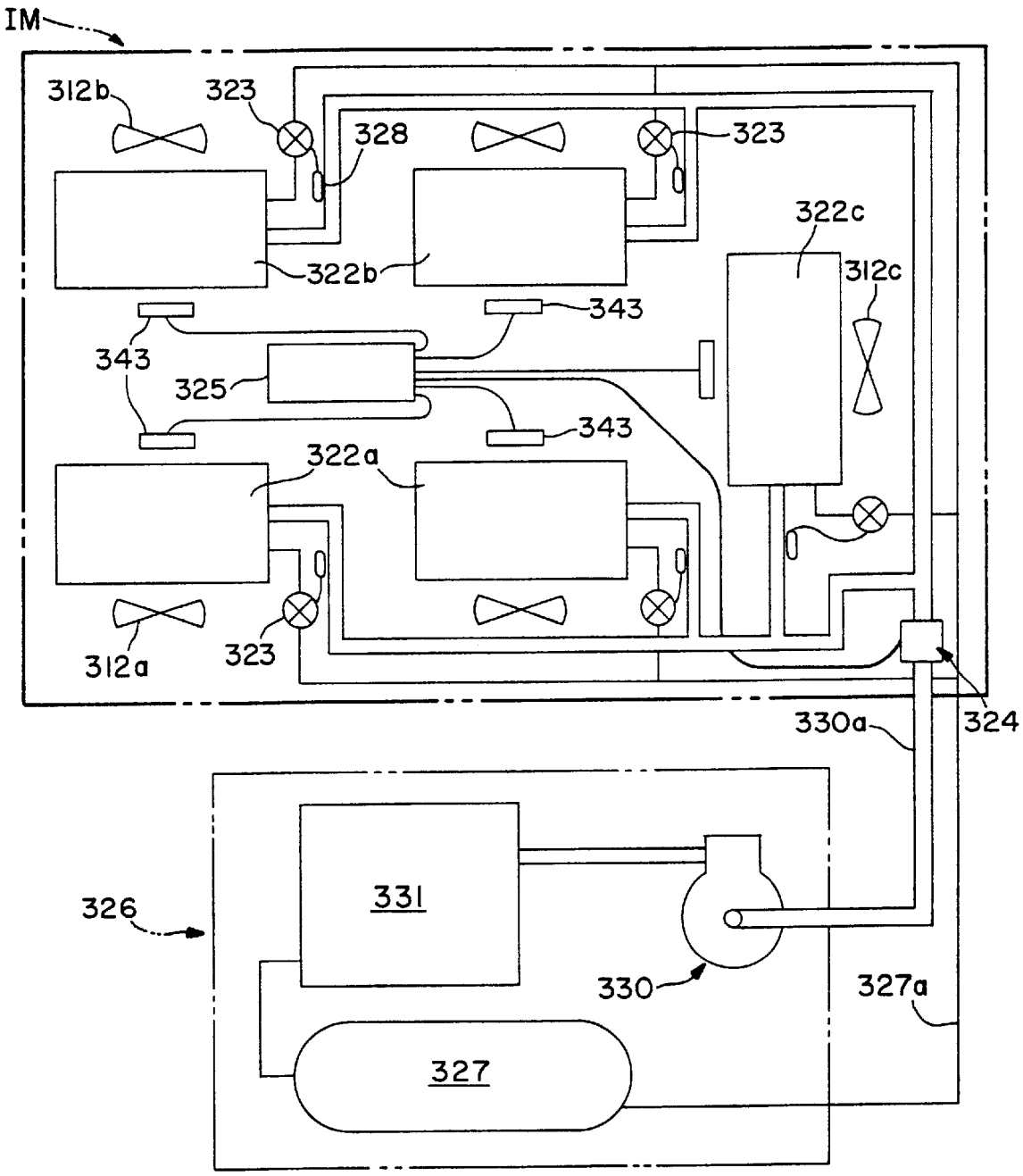
FIG. 13 is a diagrammatic depiction of the air control system of FIG. 12.

Referring to FIGS. 12 and 13, an island or "well" type merchandiser IM may be used for low temperature or medium temperature refrigeration. Such cases frequently are designed with plural product holding areas, and FIG. 12 shows a triple cabinet 310 having two parallel product areas 318a and 318b with collinear zones and an end zone 318c that extends laterally or angularly of the other areas. Typically, the two parallel zones 318a and 318b are arranged back-to-back with a common center wall 308 forming an internal air duct (not shown), and the end section 318c has an independent air circulating system. As shown best in FIG. 13, in one form of the invention each cooling zone (318) is refrigerated by evaporator coils (322a for zone 318a; 322b for zone 318b; and 322c for zone 318c). The suction from the multiple coils may be controlled by a single EEPR valve 324. The controller 325 operates the EEPR valve in response to exit air temperatures sensed by at least one sensor 343 for each air circulating system 312a, 312b and 312c. It will be understood that only a single evaporator coil (322c) may be required in some shorter island merchandiser cabinet sections.

The scope of the invention is intended to encompass such changes and modifications as will be apparent to those skilled in the art, and is only to be limited by the scope of the appended claims.

What is claimed is:

1. An air cooling system in a commercial refrigerated merchandiser having an insulated cabinet with a product area having a least two horizontally adjacent side-by-side product zones for the display and marketing of food products, said system comprising:

modular evaporator means having at least two separate coil sections of preselected length and heat exchange capability, said coil sections being horizontally disposed with their adjacent ends in spaced apart, end-to-end orientation relative to each other in said cabinet;

liquid refrigerant metering means for controlling the inlet flow of liquid refrigerant on the high side of said modular evaporator means;

said plural coil sections of said modular evaporator means being constructed and arranged in parallel refrigerant flow relationship with each other to receive liquid refrigerant from said liquid refrigerant metering means, and all of said coil sections having an operative cooling mode at the same time and an inoperative defrost mode at the same time; and separate air moving means associated with the respective coil sections for circulating separate air flows through said coil sections and being constructed and arranged with air flow passageways in said cabinet for discharging the air flows in side-by-side relationship to the horizontally adjacent side-by-side product zones for cooling.

2. The air cooling system of claim 1 which includes other refrigerant metering means constructed and arranged on the low side of said modular evaporator means for controlling the suction pressure in at least one coil section thereof.

3. The air cooling system of claim 2 which includes means for periodically defrosting said evaporator means, and in which said other refrigerant metering means includes means for sensing air temperature and adjusting the suction pressure during defrost.

4. The air cooling system of claim 2, in which said other metering means includes electronic evaporator pressure regulating (EEPR) valve means for modulating the refrigerant vapor flow rate from the coil sections of said evaporator means, and means for sensing the exit air temperature downstream of said at least one coil section, and controller means for operating said EEPR valve means in a refrigeration mode and in a defrost mode.

5. The air cooling system of claim 4, in which said liquid and other metering means and said EEPR valve means are all located within the merchandiser cabinet.

6. The air cooling system of claim 4, in which said controller means is constructed and arranged for closing said EEPR valve means during an initial de-icing period of the defrost mode, and is also arranged for modulating the EEPR valve means in an open position during a drip time period of the defrost mode in response to sensed exit air temperatures exceeding a preset value whereby to provide a refrigerating condition at the preset value for the remaining drip time of the defrost mode.

7. An air cooling system in a commercial refrigerated merchandiser having an insulated cabinet with a product area having horizontally adjacent product zones for the display and marketing of food products, said system comprising:

modular evaporator means having a plurality of separate coil sections of substantially equal size and heat exchange capability, said plural coil sections having a preselected length and being horizontally disposed in spaced apart, end-to-end orientation relative to each other in said cabinet;

liquid refrigerant metering means for controlling the inlet flow of liquid refrigerant on the high side of said modular evaporator means;

said plural coil sections of said modular evaporator means being constructed and arranged in parallel refrigerant flow relationship with each other and in series flow relationship with said liquid refrigerant metering means, and all of said coil sections having an operative cooling mode at the same time and an inoperative defrost mode at the same time; and separate air moving means associated with the respective coil sections for circulating separate air flows through said coil sections and discharging the air flows to the adjacent product zones for cooling.

8. The air cooling system of claim 7, in which said merchandiser is constructed and arranged with means for normally closing the product area from ambient during the cooling mode, and said liquid refrigerant metering means comprising a single thermostatic expansion valve , and piping means of substantially equal length connecting the outflow side of said expansion valve to each of said coil sections.

9. The air cooling system of claim 7, in which said merchandiser is constructed and arranged with the front side of said product area being open to ambient at all times, and said liquid refrigerant metering means comprising at least two thermostatic expansion valves operatively connected on the outflow side to at least two corresponding and separate coil sections.

10. The air cooling system of claim 7 which includes other refrigerant metering means constructed and arranged on the low side of said modular evaporator means for controlling the suction pressure in at least one coil section thereof.

11. The air cooling system of claim 10 which includes the means for periodically defrosting all of said evaporator means, and in which said other refrigerant metering means includes means for sensing exit air temperature and adjusting the suction pressure during defrost.

12. The air cooling system of claim 10, in which said other metering means includes evaporator pressure regulating (EEPR) valve means for modulating the refrigerant vapor flow rate from the coil sections of said modular evaporator means, and means for sensing the exit air temperature downstream of said at least one coil section, and controller means for operating said EER valve means in a refrigeration mode and in a defrost mode.

13. The air cooling system of claim 12, in which said liquid and other metering means and said EEPR valve means are all located within the merchandiser cabinet.

14. The air cooling system of claim 12, in which said controller means is constructed and arranged for closing said EEPR valve means during an initial de-icing period of the defrost mode, and is also arranged for modulating the EEPR valve means in an open position during a drip time period of the defrost mode in response to sensed exit air temperatures exceeding a preset value whereby to provide a refrigerating condition at the preset value for the remaining drip time of the defrost mode.

15. An air cooling system in a commercial refrigerated merchandiser having an insulated cabinet with a product zone, comprising:

evaporator means having a refrigeration mode and being constructed and arranged for cooling air within the cabinet to achieve a preselected exit air temperature down stream thereof, liquid refrigerant metering means for controlling the flow of liquid refrigerant to the high side of said evaporator means, for circulating air flow through said evaporator means and said product zone; and other refrigerant metering means constructed and arranged on the low side of said evaporator means for controlling the suction pressure thereof, said other metering means comprising evaporator pressure regulating (EEPR) valve means for modulating the refrigerant vapor flow from said evaporator means, and means for sensing exit air temperatures downstream of said evaporator means, and controller means responsive to said sensing means for operating said EEPR valve means in the refrigeration mode and in a defrost mode.

16. The air cooling system of claim 15, in which said controller means is constructed and arranged for closing said EEPR valve means during an initial de-icing period of the defrost mode, and is also arranged for modulating the EEPR valve means in an open position during a drip time period of the defrost mode in response to sensed exit air temperatures exceeding a preset value whereby to provide a refrigerating condition at the preset value for the remaining drip time of the defrost mode.

17. The method of controlling the exit air temperature from the evaporator coil in a commercial refrigerated merchandiser for food products, in which the evaporator coil has a refrigeration mode and a defrost mode and the suction side of the evaporator coil has an electronic evaporator pressure regulator (EEPR) valve operated by a valve controller circuit, said control method comprising the steps of:

(a) sensing the exit air temperature from the evaporator coil and generating a signal corresponding thereto;

(b) operating the EEPR valve in the refrigeration mode of the evaporator coil by modulating refrigerant vapor flow therethrough to maintain a preselected exit air temperature;

(c) operating the EEPR valve in the defrost mode of the evaporator coil, (1) by first closing the EEPR valve during a preselected de-icing period of said evaporator coil until reaching a predetermined drip temperature, and (2) then activating the valve controller circuit in response to detection of exit air temperatures exceeding a preselected value during a final drip period to provide limited refrigeration to maintain the preselected temperature during the remainder of the defrost mode.

18. A control method as set forth in claim 17 wherein the step of operating the EEPR valve in the refrigeration mode further comprises the steps of:

(1) monitoring the position of the EEPR valve, (2) timing a preselected period following the onset of operation of the EEPR valve in the refrigeration mode, the time period being selected to permit the valve to substantially stabilize in a position which maintains the exit air temperature at a set point, (3) saving a reference position of the valve at a time when the preselected period is timed out.

19. A control method as set forth in claim 18 in which the evaporator has a pull down mode, the control method further comprising the steps of:

(d) operating the EEPR valve in the pull down mode of the evaporator coil, (1) by first moving the EEPR valve to its full open position, (2) holding the EEPR valve in its full open position until the preselected exit air temperature is detected.

20. A control method as set forth in claim 19 wherein the step of operating the EEPR valve in the pull down mode further comprises the step, following detection of the preselected exit air temperature, of:

(3) setting the EEPR valve at the valve reference position stored in the valve controller during operation of the EEPR valve in the refrigeration mode.

21. A control method as set forth in claim 17 in which the evaporator has a pull down mode, the control method further comprising the steps of:

(d) operating the EEPR valve in the pull down mode of the evaporator coil, (1) by first moving the EEPR valve to its full open position, (2) holding the EEPR valve in its full open position until the preselected exit air temperature is detected.

22. An air cooling system for a commercial refrigerated merchandiser having an insulated cabinet with a product area having at least two horizontally adjacent product zones for the display and marketing of food products, said system comprising:

modular evaporator means having at least two separate coil sections of predetermined size and heat exchange capability, said coil sections being horizontally disposed with their adjacent ends in spaced apart orientation with each other and each coil section being operatively associated with one of the product zones for the refrigeration thereof;

first refrigerant metering means for controlling the inlet flow of liquid refrigerant to the high side of said modular evaporator means;

said plural coil sections of said modular evaporator means being constructed and arranged in parallel refrigerant flow relationship with each other to receive liquid refrigerant from said liquid refrigerant metering means, and all of said coil sections having an operative cooling mode at the same time and an inoperative defrost mode at the same time; and separate air moving means associated with the respective coil sections for circulating separate air flows through said coil sections and being constructed and arranged with separate air flow passageways in said cabinet for discharging the air flows to the horizontally adjacent product zones for cooling.

23. The air cooling system of claim 22, in which said cabinet is constructed and arranged with means for normally closing the product area from ambient during the cooling mode, and said first refrigerant metering means comprising a single thermostatic expansion valve, and piping means of substantially equal length connecting the outflow side of said expansion valve to each of said modular coil sections.

24. The air cooling system of claim 22, in which said cabinet is constructed and arranged with the front side of said product area being open to ambient at all times, and said first refrigerant metering means comprising at least two thermostatic expansion valves operatively connected on the outflow side to at least two corresponding and separate modular coil sections.

25. The air cooling system of claim 22 which includes other refrigerant metering means constructed and arranged on the low side of said modular evaporator means for controlling the suction pressure in at least one coil section thereof.

26. The air cooling system of claim 25 which includes means for periodically defrosting said evaporator means, and in which said second refrigerant metering means includes means for sensing exit air temperature from at least one coil section and adjusting the suction pressure thereof during defrost.

27. The air cooling system of claim 25, in which said second refrigerant metering means includes electronic evaporator pressure regulating (EEPR) valve means for modulating the refrigerant vapor flow rate from at least one coil section of said evaporator means, and means for sensing the exit air temperature downstream of said one coil section, and controller means for operating said EEPR valve means in a refrigeration mode and in a defrost mode.

28. The air cooling system of claim 27, in which said controller means is constructed and arranged for closing said EEPR valve means during an initial de-icing period of the defrost mode, and is also arranged for modulating the EEPR valve means in an open position during a drip time period of the defrost mode in response to sensed exit air temperatures exceeding a preset value whereby to provide a refrigerating condition at the preset value for the remaining drip time of the defrost mode.

29. The air cooling system of claim 22, in which the length of a first of the horizontally adjacent product zones extends angularly relative to the length of a second of the horizontally adjacent product zones, and in which the coil sections associated with said first and second of the horizontally adjacent product zones are non-collinearly disposed in said cabinet.

30. The air cooling system of claim 22, in which said product area includes a third product zone horizontally adjacent to and contiguous with said first of the horizontally adjacent product zones, and in which the coil sections associated with said first and third horizontally adjacent product zones are collinearly disposed in end-to-end relationship in said cabinet.

31. In combination with a commercial refrigerated merchandiser having an insulated cabinet with a product area having at least two horizontally adjacent product zones of predetermined length for the display and marketing of food products, a refrigeration system comprising:

modular air cooling and circulating means having at least two separate evaporator coil sections of predetermined heat exchange capability, each coil section having elongated coil tubing of preselected length corresponding substantially to the length of an associated one of said product zones, and further having separate air moving means for the circulation of refrigerating air flow across each of the respective coil sections;

liquid refrigerant metering means for controlling the inlet flow of liquid refrigerant to the high side of said coil sections;

said coil sections of said modular air cooling means being constructed and arranged in parallel refrigerant flow relationship with each other to receive liquid refrigerant from said liquid refrigerant metering means, and all of said coil sections having an operative cooling mode at the same time and an inoperative defrost mode at the same time; and said modular air cooling and circulating means being constructed and arranged in said insulated cabinet with each coil section and its air moving means being in operative relationship with its associated product zone for the circulation of separate air flows through the coil sections and the discharge of such air flows separately to the adjacent product zones for cooling.

32. The refrigerated merchandiser of claim 31 in which the refrigeration system includes other refrigerant metering means constructed and arranged on the low side of said coil sections for controlling the suction pressure in at least one coil section thereof.

33. The refrigerated merchandiser of claim 32, in which said other metering means includes electronic evaporator pressure regulating (EEPR) valve means for modulating the refrigerant vapor flow rate from the modular coil sections, and means for sensing the exit air temperature downstream of said at least one coil section, and controller means for operating said EEPR valve means in a refrigeration mode and in a defrost mode.

34. The refrigerated merchandiser of claim 33, in which said controller means is constructed and arranged for closing said EEPR valve during an initial de-icing period of the defrost mode, and is also arranged for modulating the EEPR valve means in an open position during a drip time period of the defrost mode in response to sensed exit air temperatures exceeding a preset value whereby to provide a refrigerating condition at the preset value for the remaining drip time of the defrost mode.

35. The refrigerated merchandiser of claim 31, in which said cabinet is constructed and arranged with means for normally closing the product area from ambient during the cooling mode, and said liquid refrigerant metering means comprising a single thermostatic expansion valve, and piping means of substantially equal length connecting the outflow side of said expansion valve to each of said coil sections.

36. The refrigerated merchandiser of claim 31, in which said cabinet is constructed and arranged with the front side of said product area being open to ambient at all times, and said liquid refrigerant metering means comprising at least two thermostatic expansion valves operatively connected on the outflow side to at least two corresponding and separate coil sections.

37. The refrigerated merchandiser of claim 31, in which the length of a first of the horizontally adjacent product zones extends angularly relative to the length of a second of the horizontally adjacent product zones, and in which the coil sections associated with said first and second of the horizontally adjacent product zones are non-collinearly disposed in said cabinet.

38. The refrigerated merchandiser of claim 37, in which said product area includes a third product zone horizontally adjacent to and contiguous with said first of the horizontally adjacent product zones, and in which the coil sections associated with said first and third horizontally adjacent product zones are collinearly disposed in end-to-end relationship in said cabinet.

*39. An air cooling system in a commercial refrigerated merchandiser having an insulated cabinet with a product zone, comprising:*

*evaporator means having a refrigeration mode and being constructed and arranged for cooling air within the cabinet to achieve a preselected exit air temperature downstream thereof, liquid refrigerant metering means for controlling the flow of liquid refrigerant to the high side of said evaporator means, means for circulating air flow through said evaporator means and said product zone; and*

*other refrigerant metering means constructed and arranged on the low side of said evaporator means for controlling the suction pressure thereof, said other metering means comprising evaporator pressure regulating (EEPR) valve means for modulating the refrigerant vapor flow from said evaporator means, said EEPR valve means including an EEPR valve and a stepper motor for actuating said EEPR valve to modulate the low side refrigerant vapor flow, means for sensing exit air temperatures downstream of said evaporator means, and controller means responsive to said sensing means for operating the stepper motor to actuate said EEPR valve in the refrigeration mode and in a defrost mode of the air cooling system.*

*40. The air cooling system of claim 39 in which said controller means is constructed and arranged to monitor the position of the EEPR valve in the refrigeration mode for a preselected period of time following the onset of the refrigeration mode and to store a reference position of the valve at the end of the preselected period.*

*41. The air cooling system of claim 40 in which said controller means is constructed and arranged to operate the stepper motor to move the EEPR valve to said reference position following the defrost mode.*

*42. The air cooling system of claim 39 in which the stepper motor moves the EEPR valve through a predetermined number of incremental steps to a new position for affecting the exit air temperature in response to said means for sensing exit air temperature upon receiving a signal from said controller means, said controller means being constructed and arranged to control the stepper motor for moving the EEPR valve in the refrigeration mode so that the EEPR valve always approaches the new position from the same direction.*

*43. The air cooling system of claim 42 wherein said controller means controls the stepper motor to move the EEPR valve to the new position during the refrigeration mode only in a direction which causes the valve to be more open.*

*44. The air cooling system of claim 39 in which said liquid refrigerant means comprises an expansion valve and means for sensing temperature of the refrigerant on the low side of said evaporator means, the expansion valve being responsive to said means for sensing refrigerant temperature to modulate the flow of liquid refrigerant into said evaporator means to maintain a substantially constant superheat temperature.*

*45. A method of controlling the exit air temperature from the evaporator coil in a commercial refrigerated merchandiser for food products, in which the evaporator coil has a refrigeration mode and a defrost mode, said control method comprising the steps of:*

*(a) providing an electronic evaporator pressure regulator (EEPR) valve actuated by a stepper motor operated by a valve controller circuit,*

*(b) sensing the exit air temperature from the evaporator coil and generating a signal corresponding thereto;*

*(c) operating the stepper motor in response to said signal to move the EEPR valve during the refrigeration mode of the evaporator coil for modulating refrigerant vapor flow therethrough to maintain a preselected exit air temperature*

*(d) operating the stepper motor to a predetermined position of the EEPR valve in the defrost mode.*

*46. The method of claim 45 further comprising:*

*(a) monitoring the position of the EEPR valve during the refrigeration mode,*

*(b) timing a preselected period following the onset of operation of the EEPR valve in the refrigeration mode, the time period being selected to permit the valve to substantially stabilize in a position which maintains the exit air temperature at a set point,*

(c) *storing a reference position of the EEPR valve at the end of the preselected period.*

*47. The method of claim 46 further comprising the step of operating the stepper motor to move the EEPR valve to the stored reference position at the onset of operation in the refrigeration mode following the defrost mode.*

*48. The method of claim 45 in which the step of operating the stepper motor comprises the step of activating the stepper motor for movement through a selected number of incremental steps corresponding to the signal.*

*49. The method of claim 45 in which operating the stepper motor to move the EEPR valve includes moving the valve to a new position, said step of moving comprising always approaching the new position from the same direction during the refrigeration mode.*

*50. The method of claim 49 in which moving the valve to a new position during the refrigeration mode comprises always moving the EEPR valve means to the new position in a direction which causes the valve to be more open.*

*51. The method of claim 45 further including the step of controlling the flow of liquid refrigerant to the high side of the evaporator coil to maintain a substantially constant superheat temperature on the low side of the evaporator coil.*

*52. A method of controlling the flow of liquid refrigerant through an evaporator coil in a commercial refrigerated merchandiser for food products, in which the evaporator coil has a refrigeration mode and a defrost mode and a low side of the evaporator coil has an electronic evaporator pressure regulator (EEPR) valve operated by a valve controller circuit, said control method comprising the steps of:*

(a) *maintaining exit air temperature in the refrigeration mode at a set point by modulating the EEPR valve in response to sensed exit air temperature from the evaporator coil,*

(b) *monitoring the position of the EEPR valve,*

(c) *timing a preselected period following the onset of operation of the EEPR valve in the refrigeration mode, the time period being selected to permit the valve to substantially stabilize in a position which maintains the exit air temperature at the set point,*

(d) *storing a reference position of the EEPR valve at the end of the preselected period,*

(e) *entering the defrost mode by closing the EEPR valve,*

(f) *setting the EEPR valve at the stored reference position at the conclusion of the defrost mode upon entry into the refrigeration mode.*

*53. An air cooling system in a commercial refrigerated merchandiser having an insulated cabinet with a product zone, comprising:*

*evaporator means having a refrigeration mode and being constructed and arranged for cooling air within the cabinet to achieve a preselected exit air temperature downstream thereof, liquid refrigerant metering means for controlling the flow of liquid refrigerant to the high side of said evaporator means, means for circulating air flow through said evaporator means and said product zone; and*

*other refrigerant metering means constructed and arranged on the low side of said evaporator means for controlling the suction pressure thereof, said other metering means comprising evaporator pressure regulating (EEPR) valve means for modulating the refrigerant vapor flow from said evaporator means, said EEPR valve means including an EEPR valve and a stepper motor for actuating said EEPR valve to modulate the low side refrigerant vapor flow including means for sensing exit air temperatures downstream of said evaporator means, and controller means responsive to said sensing means for operating the stepper motor to actuate said EEPR valve in the refrigeration mode and in a defrost mode of the air cooling system, the stepper motor being constructed and arranged to move the EEPR valve through a predetermined number of incremental steps to a new position for affecting the exit air temperature in response to said means for sensing exit air temperature upon receiving a signal from said controller means, said controller means being constructed and arranged to control the stepper motor for moving the EEPR valve in the refrigeration mode so that the EEPR valve always approaches the new position from the same direction.*

*54. The air cooling system of claim 53 wherein said controller means controls the stepper motor to move the EEPR valve to the new position during the refrigeration mode only in a direction which causes the valve to be more open.*

*55. The air cooling system of claim 15 in which said EEPR valve means includes an EEPR valve and a stepper motor for actuating said EEPR valve to modulate low side refrigerant vapor flow in the refrigeration mode and for moving the EEPR valve to a predetermined position in the defrost mode.*

*56. The air cooling system of claim 55 in which said controller means is constructed and arranged to monitor the position of the EEPR valve in the refrigeration mode for a preselected period of time following the onset of the refrigeration mode and to store a reference position of the valve at the end of the preselected period.*

*57. The air cooling system of claim 56 in which said controller means is constructed and arranged to operate the stepper motor to move the EEPR valve to said reference position following the defrost mode.*

*58. The air cooling system of claim 55 in which the stepper motor moves the EEPR valve through a predetermined number of incremental steps to a new position for affecting the exit air temperature in response to said means for sensing exit air temperature upon receiving a signal from said controller means, said controller means being constructed and arranged to control the stepper motor for moving the EEPR valve in the refrigeration mode so that the EEPR valve always approaches the new position from the same direction.*

*59. The air cooling system of claim 58 wherein said controller means controls the stepper motor to move the EEPR valve to the new position during the refrigeration mode only in a direction which causes the valve to be more open.*

* * * * *